United States Patent
Wang et al.

(10) Patent No.: US 10,637,558 B2
(45) Date of Patent: Apr. 28, 2020

(54) HIGH-ALTITUDE COMMUNICATIONS SYSTEM, METHOD, AND APPARATUS

(71) Applicant: HUAWEI TECHNOLOGIES CO., LTD., Shenzhen, Guangdong (CN)

(72) Inventors: Kaiyao Wang, Beijing (CN); Yongjun Liu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/457,578

(22) Filed: Jun. 28, 2019

(65) Prior Publication Data

US 2019/0326981 A1 Oct. 24, 2019

Related U.S. Application Data

(63) Continuation of application No. PCT/CN2017/118344, filed on Dec. 25, 2017.

(30) Foreign Application Priority Data

Dec. 30, 2016 (CN) .......................... 2016 1 1265788

(51) Int. Cl.
*H04B 7/185* (2006.01)
*H04B 7/06* (2006.01)
*H04B 7/08* (2006.01)

(52) U.S. Cl.
CPC ....... *H04B 7/18504* (2013.01); *H04B 7/0617* (2013.01); *H04B 7/086* (2013.01); *H04B 7/0834* (2013.01); *H04B 7/18506* (2013.01)

(58) Field of Classification Search
CPC ................ H04B 7/18504; H04B 7/185; H04B 7/18506; H04B 7/06; H04W 84/06; B64C 2201/122
See application file for complete search history.

(56) References Cited

U.S. PATENT DOCUMENTS 9,321,517 B1 4/2016 Devaul
10,476,296 B1 * 11/2019 Rausch ................... H02S 40/38
(Continued)

FOREIGN PATENT DOCUMENTS

CN 1422447 A 6/2003
CN 102092471 A 6/2011
(Continued)

OTHER PUBLICATIONS

Sheng-Cheng Yeh et al. The Research of Locating Methods for Mobile Stations Based on IEEE 802.16e Multi-hop WMANs, Workshops of International Conference on Advanced Information Networking and Applications, 2011. pp. 77-80.

*Primary Examiner* — Kevin Kim
(74) *Attorney, Agent, or Firm* — Womble Bond Dickinson (US) LLP

(57) ABSTRACT

Embodiments of the present invention provide an air-ground communication control method. The method is applied to a hierarchical network that includes a ground network and at least one aerial network, and the method includes: receiving, by a ground platform, location information of a high-altitude platform sent by the high-altitude platform, where the ground platform is located in the ground network, the high-altitude platform is located in the aerial network, and a beam of the high-altitude platform covers the ground platform; determining a beam direction of a beam from the ground platform to the high-altitude platform according to location information of the ground platform and the location information of the high-altitude platform; and sending beam width information to the high-altitude platform in the beam direction, where the beam width information is used to adjust an interval of sending the location information of the high-altitude platform.

29 Claims, 17 Drawing Sheets

(56) References Cited

U.S. PATENT DOCUMENTS

| | | |
|---|---|---|
| 2010/0001534 A1 | 1/2010 | Kim |
| 2012/0235410 A1 | 9/2012 | Serrano |
| 2014/0266896 A1 | 9/2014 | Hyslop |
| 2016/0212669 A1 | 7/2016 | Davis |
| 2018/0054251 A1* | 2/2018 | Alex .................... H04W 52/42 |
| 2018/0262264 A1* | 9/2018 | Alexander ......... H04B 7/18504 |
| 2018/0294870 A1* | 10/2018 | Van Wynsberghe ... B64D 47/00 |
| 2019/0229799 A1 | 7/2019 | Behroozi |

FOREIGN PATENT DOCUMENTS

| | | |
|---|---|---|
| CN | 104407347 A | 3/2015 |
| CN | 104919651 A | 9/2015 |
| CN | 105917595 A | 8/2016 |
| EP | 2161855 A1 | 3/2010 |
| WO | 0180356 A2 | 10/2001 |
| WO | 2004004157 A2 | 1/2004 |
| WO | 2016061535 A1 | 4/2016 |

* cited by examiner

HIGH-ALTITUDE COMMUNICATIONS SYSTEM, METHOD, AND APPARATUS

CROSS-REFERENCE TO RELATED APPLICATIONS

This application is a continuation of International Application No. PCT/CN2017/118344, filed on Dec. 25, 2017, which claims priority to Chinese Patent Application No. 201611265788.4, filed on Dec. 30, 2016. The disclosures of the aforementioned applications are hereby incorporated by reference in their entireties.

TECHNICAL FIELD

The present invention relates to the field of wireless communications technologies, and in particular, to a high-altitude communications system, method, and apparatus.

BACKGROUND

According to a report of the International Telecommunication Union (ITU), currently, nearly two-thirds of the world's population still has no access to the Internet, and is mainly distributed in remote areas with a low population density. Network coverage on these areas by using ground base stations has very high costs. An high-altitude platform (a balloon, an airship, or a drone) is a new means to provide a wide coverage network for the remote areas. Generally, a high-altitude platform is located in the stratosphere at an altitude of 18 km to 25 km above the ground. The stratosphere generally has a relatively low wind speed (for example, a wind speed of 5 m/s to 40 m/s) and relatively small turbulence. In addition, an altitude higher than 18 km generally exceeds a maximum altitude specified for a commercial plane. Therefore, when deployed at an altitude of 18 km to 25 km, a high-altitude platform does not cause much interference to a commercial plane.

In a related technology such as Project Loon, a high-altitude platform carries a base station (including a communications device such as a baseband unit (BBU), a remote radio unit (RRU), or an antenna) to rise to the stratosphere, and the high-altitude base station communicates with a ground core network through wireless backhaul. The high-altitude platform needs to take protection measures such as low temperature, low pressure, low humidity, and heat dissipation on the communications device, to prevent the device from being affected. The high-altitude platform is powered by solar cells.

During implementation of the present invention, the inventor finds that the prior art has at least the following problems:

Load of the high-altitude platform is directly proportional to a size and costs of the platform. Issues such as a volume, a weight, thermal insulation, heat dissipation, and power consumption of the base station moved to the high-altitude platform impose quite high requirements on a valid payload and a power supply capacity of the high-altitude platform.

Usually, a high-altitude device continuously moves in air, instead of staying at a specific location. When a wind speed is stable, the high-altitude device may roughly fly along a track with a radius R and a central location under the control of a flight control system. However, when the wind speed is unstable, for example, when there is atmospheric turbulence or the like, the wind speed and a wind direction change. Consequently, a moving rate of the high-altitude device relative to the ground changes, and the high-altitude device may fly out of a beam coverage area, thereby causing a free space link between the high-altitude device and a ground device to be unstable or even interrupted.

SUMMARY

To resolve the problems in the prior art, embodiments of the present invention provide a high-altitude communications system, method, and apparatus. The technical solutions are as follows.

According to one aspect, an embodiment of the present invention provides an air-ground communication control method, where the method is applied to a hierarchical network that includes a ground network and at least one aerial network, and the method includes:

obtaining, by a ground device, a beam coverage radius for a high-altitude device, where the beam coverage radius is calculated according to a current moving speed of the high-altitude device relative to the ground or a flight track radius of the high-altitude device, the flight track radius of the high-altitude device is calculated according to location information of the high-altitude device, the ground device is located in the ground network, the high-altitude device is located in the aerial network, and a beam of the high-altitude device covers the ground device;

determining a direction of a beam from the ground device to the high-altitude device according to location information of the ground device;

determining a width of the beam from the ground device to the high-altitude device according to the beam coverage radius; and controlling the beam from the ground device to the high-altitude device according to the beam direction and the beam width.

Optionally, the determining a direction of a beam from the ground device to the high-altitude device according to location information of the ground device includes:

calculating coordinates of a central location of a moving track of the high-altitude device according to the location information of the high-altitude device; and calculating the beam direction according to the coordinates of the central location of the moving track and the location information of the ground device.

Optionally, the determining a width of the beam from the ground device to the high-altitude device according to the beam coverage radius includes:

calculating the coordinates of the central location of the moving track of the high-altitude device according to the location information of the high-altitude device; and calculating the beam width according to the coordinates of the central location of the moving track, the location information of the ground device, and the beam coverage radius.

In another possible implementation, optionally, the determining a direction of a beam from the ground device to the high-altitude device according to location information of the ground device includes:

calculating a distance between the ground device and the central location of the moving track according to the coordinates of the central location of the moving track and the location information of the ground device; and calculating the beam direction according to the distance between the ground device and the central location of the moving track, the coordinates of the central location of the moving track, and the location information of the ground device.

In another possible implementation, the determining a width of the beam from the ground device to the high-altitude device according to the beam coverage radius includes:

calculating a distance between the ground device and the central location of the moving track according to the coordinates of the central location of the moving track and the location information of the ground device; and calculating the beam width according to the distance between the ground device and the central location of the moving track, the beam coverage radius, the coordinates of the central location of the moving track, and the location information of the ground device.

In another possible implementation, optionally, the determining a direction of a beam from the ground device to the high-altitude device according to location information of the ground device includes:

calculating a distance between the ground device and the high-altitude device according to the location information of the ground device and the location information of the high-altitude device; and calculating the beam direction according to the distance between the ground device and the high-altitude device, the location information of the high-altitude device, and the location information of the ground device.

In another possible implementation, optionally, the determining a width of the beam from the ground device to the high-altitude device according to the beam coverage radius includes:

calculating a distance between the ground device and the high-altitude device according to the location information of the ground device and the location information of the high-altitude device; and calculating beam width information according to the distance between the ground device and the high-altitude device, the beam coverage radius, the location information of the high-altitude device, and the location information of the ground device.

According to another aspect, an embodiment of the present invention provides an air-ground communication control method, where the method is applied to a hierarchical network that includes a ground network and at least one aerial network, and the method includes:

calculating, by a high-altitude device, a beam coverage radius of a ground device for the high-altitude device according to a current moving speed relative to the ground or a flight track radius of the high-altitude device, where the flight track radius of the high-altitude device is calculated according to location information of the high-altitude device, the beam coverage radius is used to calculate a width of a beam from the ground device to the high-altitude device, the ground device is located in the ground network, the high-altitude device is located in the aerial network, and a beam of the high-altitude device covers the ground device;

obtaining, by the high-altitude device, wind speed information, where the wind speed information indicates an instantaneous wind speed obtained by the high-altitude device;

calculating, by the high-altitude device, a wind speed variation, where the wind speed variation is a vector including a wind speed change value and a direction, and the wind speed variation is used to indicate a variation between a current instantaneous wind speed and a previously obtained average wind speed in a time period;

comparing the wind speed change value with a preset threshold;

determining, according to a comparison result, whether the beam coverage radius needs to be recalculated; and sending beam control information to the ground device, where the beam control information includes at least the beam coverage radius.

Optionally, the method further includes:

obtaining, by the high-altitude device, the location information of the high-altitude device; and sending the location information of the high-altitude device to the ground device.

Optionally, the determining, according to a comparison result, whether the beam coverage radius needs to be recalculated includes:

if the wind speed change value is greater than or equal to the preset threshold, recalculating the beam coverage radius, where optionally, the recalculating the beam coverage radius includes:

calculating a new moving speed of the high-altitude device relative to the ground according to the wind speed variation and the current moving speed of the high-altitude device relative to the ground; and recalculating the beam coverage radius according to the new moving speed relative to the ground; or if the wind speed change value is less than or equal to the preset threshold, skipping recalculating the beam coverage radius.

Optionally, the method further includes:

calculating coordinates of a central location of a moving track of the high-altitude device according to the location information of the high-altitude device; and calculating a direction and a width of a beam from the high-altitude device to the ground device according to the coordinates of the central location of the moving track and location information of the ground device.

Optionally, the calculating a direction and a width of a beam from the high-altitude device to the ground device according to the coordinates of the central location of the moving track and location information of the ground device includes:

1. calculating a distance between the ground device and the central location of the moving track according to the coordinates of the central location of the moving track and the location information of the ground device;

2. calculating the beam direction according to the distance between the ground device and the central location of the moving track, the coordinates of the central location of the moving track, and the location information of the ground device;

3. calculating a radius of the moving track according to the location information of the high-altitude device; and 4. calculating beam width information according to the distance between the ground device and the central location of the moving track, a first preset value, the coordinates of the central location of the moving track, and the location information of the ground device, where the first preset value is greater than or equal to the radius of the moving track.

In another possible implementation, optionally, the calculating a direction and a width of a beam from the high-altitude device to the ground device according to the coordinates of the central location of the moving track and location information of the ground device includes:

1. calculating a radius of the moving track according to the location information of the high-altitude device;

2. calculating a distance between the ground device and the high-altitude device according to the location information of the ground device and the location information of the high-altitude device;

3. calculating the beam direction according to the distance between the ground device and the high-altitude device, the location information of the high-altitude device, and the location information of the ground device; and 4. calculating beam width information according to the distance between the ground device and the high-altitude device, a second preset value, the location information of the high-altitude device, and the location information of the ground device, where the second preset value is greater than zero and less than or equal to the radius of the moving track.

Optionally, the ground device is a BBU, a base station, or a cloud baseband unit, the cloud baseband unit includes a plurality of BBUs, and the high-altitude device is an RRU, a repeater, or an antenna.

According to still another aspect, an embodiment of the present invention provides a ground device, where the ground device is applied to a hierarchical network that includes a ground network and at least one aerial network, the ground device is configured to control air-ground communication, and the ground device includes:

an obtaining module, configured to obtain a beam coverage radius for a high-altitude device, where the beam coverage radius is calculated according to a current moving speed of the high-altitude device relative to the ground or a flight track radius of the high-altitude device, the flight track radius of the high-altitude device is calculated according to location information of the high-altitude device, the ground device is located in the ground network, the high-altitude device is located in the aerial network, and a beam of the high-altitude device covers the ground device;

a beam direction module, configured to determine a direction of a beam from the ground device to the high-altitude device according to location information of the ground device;

a beam width module, configured to determine a width of the beam from the ground device to the high-altitude device according to the beam coverage radius obtained by the obtaining module; and a control module, configured to control the beam from the ground device to the high-altitude device according to the beam direction determined by the beam direction module and the beam width determined by the beam width module.

Optionally, the beam direction module may include:

a track center coordinates calculation unit, configured to calculate coordinates of a central location of a moving track of the high-altitude device according to the location information of the high-altitude device; and a direction calculation unit, configured to calculate the beam direction according to the coordinates of the central location of the moving track that are calculated by the track center coordinates calculation unit and the location information of the ground device.

Optionally, the beam width module includes:

a track center coordinates calculation unit, configured to calculate coordinates of a central location of a moving track of the high-altitude device according to the location information of the high-altitude device; and a beam width calculation unit, configured to calculate the beam width according to the coordinates of the central location of the moving track, the location information of the ground device, and the beam coverage radius.

In another possible implementation, the beam direction module may include:

a distance calculation module, configured to calculate a distance between the ground device and the high-altitude device according to the location information of the ground device and the location information of the high-altitude device; and a beam direction calculation module, configured to calculate the beam direction according to the distance that is between the ground device and the high-altitude device and that is calculated by the distance calculation module, the location information of the high-altitude device, and the location information of the ground device.

In another possible implementation, the beam width module includes:

a radius calculation module, configured to calculate a radius of a moving track according to the location information of the high-altitude device;

a distance calculation module, configured to calculate a distance between the ground device and the high-altitude device according to the location information of the ground device and the location information of the high-altitude device; and a beam width information calculation module, configured to calculate beam width information according to the distance that is between the ground device and the high-altitude device and that is calculated by the distance calculation module, the beam coverage radius, the location information of the high-altitude device, and the location information of the ground device.

According to yet another aspect, an embodiment of the present invention provides a high-altitude device, where the high-altitude device is applied to a hierarchical network that includes a ground network and at least one aerial network, the high-altitude device is configured to control air-ground communication, and the high-altitude device includes:

a beam coverage radius obtaining module, configured to calculate a beam coverage radius of a ground device for the high-altitude device according to a current moving speed relative to the ground or a flight track radius of the high-altitude device, where the flight track radius of the high-altitude device is calculated according to location information of the high-altitude device, the beam coverage radius is used to calculate a width of a beam from the ground device to the high-altitude device, the ground device is located in the ground network, the high-altitude device is located in the aerial network, and a beam of the high-altitude device covers the ground device;

an information obtaining module, configured to obtain wind speed information, where the wind speed information indicates an instantaneous wind speed obtained by the high-altitude device, where optionally, for example, the information obtaining module may include a Global Positioning System (GPS), an inertial navigation system, an anemometer, and various motion sensors (such as an accelerometer, a magnetometer, and a gyroscope);

a wind speed variation calculation module, configured to calculate a wind speed variation, where the wind speed variation is a vector including a wind speed change value and a direction, and the wind speed variation is used to indicate a variation between a current instantaneous wind speed obtained by the information obtaining module and a previously obtained average wind speed in a time period;

a comparison module, configured to: compare, with a preset threshold, the wind speed change value calculated by the wind speed variation calculation module, and determine, according to a comparison result, whether the beam coverage radius needs to be recalculated, where the comparison module is specifically configured to: compare, with the preset threshold, the wind speed change value calculated by the wind speed variation calculation module, and if the wind speed change value is greater than or equal to the preset threshold, recalculate the beam coverage radius; or if the wind speed change value is less than the preset threshold, skip recalculating the beam coverage radius. In one embodiment, if the wind speed change value is greater than the preset threshold, the comparison module is configured to recalculate the beam coverage radius; or if the wind speed change value is less than or equal to the preset threshold, skip recalculating the beam coverage radius; and further, if the comparison module determines to recalculate the beam coverage radius, the beam coverage radius obtaining module is further configured to:

calculate a new moving speed of the high-altitude device relative to the ground according to the wind speed variation and the current moving speed of the high-altitude device relative to the ground; and recalculate the beam coverage radius according to the new moving speed relative to the ground; and a sending module, configured to send beam control information to the ground device, where the beam control information includes at least the beam coverage radius.

Optionally, the high-altitude device further includes:

a beam direction control module, configured to determine a direction and width information of a beam from the high-altitude device to the ground device according to the location information of the high-altitude device obtained by the information obtaining module and location information of the ground device, where the location information of the ground device is preconfigured for the high-altitude device, where the sending module is specifically configured to:

send the location information of the high-altitude device to the ground device in the beam direction determined by the beam direction control module.

Further, the information obtaining module is further configured to obtain the location information of the high-altitude device; and the sending module is further configured to send the location information of the high-altitude device obtained by the information obtaining module to the ground device.

Optionally, the ground device is a BBU, a base station, or a cloud baseband unit, the cloud baseband unit includes a plurality of BBUs, and the high-altitude device is an RRU, a repeater, or an antenna.

An embodiment of the present invention provides a distributed high-altitude platform communications system, where the system includes a high-altitude lightweight front-end platform device and a ground heavyweight processing platform device.

The high-altitude lightweight front-end platform device includes the high-altitude platform according to the foregoing embodiment and an aerial device, where the aerial device carries the high-altitude platform to camp or move in air.

The ground heavyweight processing platform device includes the ground platform according to the foregoing embodiment and an antenna, where the antenna and the ground platform cooperate to send data.

In this embodiment of the present invention, there are a plurality of high-altitude platforms and one ground platform, the high-altitude platforms and the ground platform form a star topology, and the plurality of high-altitude platforms separately perform wireless fronthaul communication with the ground platform.

In this embodiment of the present invention, there are a plurality of high-altitude platforms whose quantity is the same as that of the ground platform, and each high-altitude platform uniquely corresponds to one ground platform for wireless fronthaul communication.

In this embodiment of the present invention, there are a plurality of high-altitude platforms that form a chain topology, and there is one ground platform device, one high-altitude platform performs wireless fronthaul communication with the ground platform, and other high-altitude platforms communicate with the one high-altitude platform by using a trunk link.

In the technical solutions provided in the embodiments of the present invention, the high-altitude device may determine, according to a real-time wind speed change, whether the beam coverage radius needs to be recalculated, so that the ground device can dynamically adjust the beam width according to the beam coverage radius and a link between the ground device and the high-altitude device has more stable quality.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Example embodiments are described in detail herein, and examples of the example embodiments are presented in the accompanying drawings. When the following description is made with reference to the accompanying drawings, unless specified otherwise, same numbers in different accompanying drawings represent a same or similar element. Implementations described in the following example embodiments do not represent all implementations consistent with the present invention. On the contrary, they are only examples of apparatuses and methods that are described in the appended claims in detail and that are consistent with some aspects of the present invention.

Figure 11:
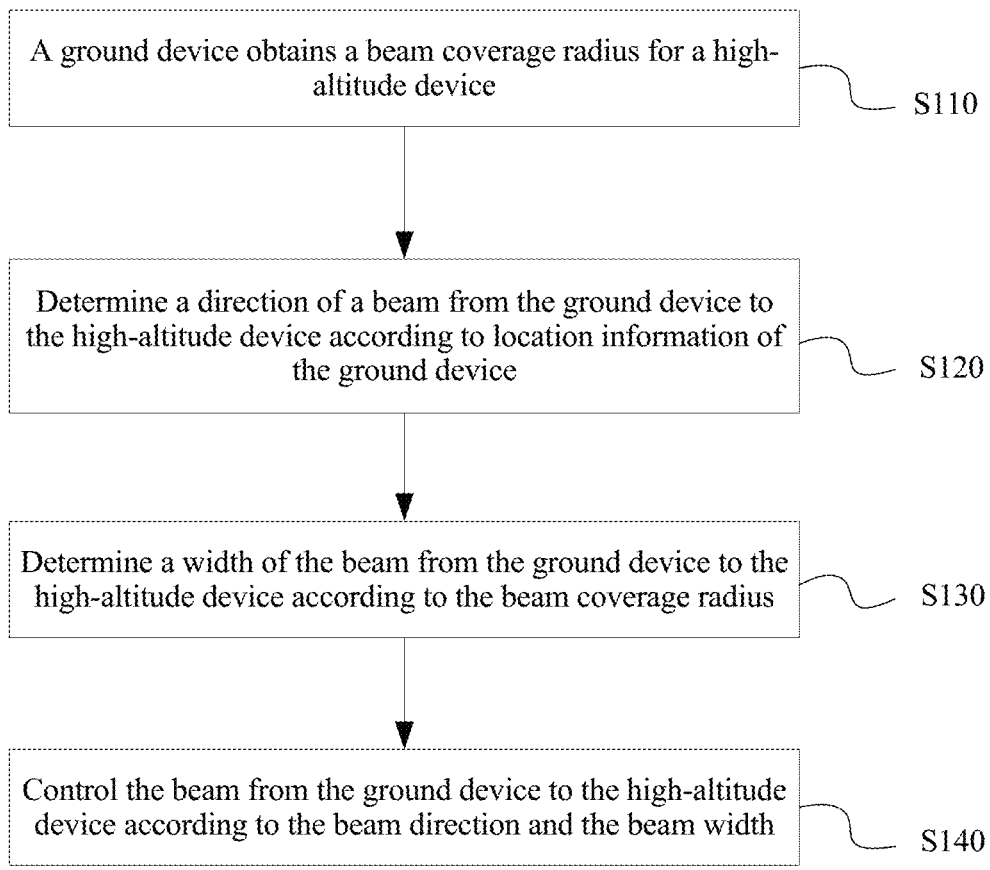
FIG. 11 is a flowchart of a communication method according to an embodiment of the present invention.

As shown in FIG. 11, an embodiment of the present invention provides an air-ground communication control method. The method is applied to a hierarchical network that includes a ground network and at least one aerial network, and the method includes:

S110. A ground device obtains a beam coverage radius for a high-altitude device, where the beam coverage radius is calculated according to a current moving speed of the high-altitude device relative to the ground or a flight track radius of the high-altitude device, the flight track radius of the high-altitude device is calculated according to location information of the high-altitude device, the ground device is located in the ground network, the high-altitude device is located in the aerial network, and a beam of the high-altitude device covers the ground device.

S120. Determine a direction of a beam from the ground device to the high-altitude device according to location information of the ground device.

S130. Determine a width of the beam from the ground device to the high-altitude device according to the beam coverage radius.

S140. Control the beam from the ground device to the high-altitude device according to the beam direction and the beam width.

Optionally, step S120 of determining a direction of a beam from the ground device to the high-altitude device according to location information of the ground device includes:

S121. Calculate coordinates of a central location of a moving track of the high-altitude device according to the location information of the high-altitude device.

S122. Calculate the beam direction according to the coordinates of the central location of the moving track and the location information of the ground device.

Optionally, step S130 of determining a width of the beam from the ground device to the high-altitude device according to the beam coverage radius includes:

S131. Calculate coordinates of a central location of a moving track of the high-altitude device according to the location information of the high-altitude device.

S132. Calculate the beam width according to the coordinates of the central location of the moving track, the location information of the ground device, and the beam coverage radius.

In another possible implementation, optionally, step S120 of determining a direction of a beam from the ground device to the high-altitude device according to location information of the ground device includes:

S1201. Calculate a distance between the ground device and a central location of a moving track according to coordinates of the central location of the moving track and the location information of the ground device.

S1202. Calculate the beam direction according to the distance between the ground device and the central location of the moving track, the coordinates of the central location of the moving track, and the location information of the ground device.

In another possible implementation, step S130 of determining a width of the beam from the ground device to the high-altitude device according to the beam coverage radius includes:

S1301. Calculate a distance between the ground device and a central location of a moving track according to coordinates of the central location of the moving track and the location information of the ground device.

S1302. Calculate the beam width according to the distance between the ground device and the central location of the moving track, the beam coverage radius, the coordinates of the central location of the moving track, and the location information of the ground device.

In another possible implementation, optionally, step S120 of determining a direction of a beam from the ground device to the high-altitude device according to location information of the ground device includes:

S12010. Calculate a distance between the ground device and the high-altitude device according to the location information of the ground device and the location information of the high-altitude device.

S12020. Calculate the beam direction according to the distance between the ground device and the high-altitude device, the location information of the high-altitude device, and the location information of the ground device.

In another possible implementation, optionally, step S130 of determining a width of the beam from the ground device to the high-altitude device according to the beam coverage radius includes:

S13010. Calculate a distance between the ground device and the high-altitude device according to the location information of the ground device and the location information of the high-altitude device.

S13020. Calculate beam width information according to the distance between the ground device and the high-altitude device, the beam coverage radius, the location information of the high-altitude device, and the location information of the ground device.

Optionally, the ground device is a BBU, a base station, or a cloud baseband unit, the cloud baseband unit includes a plurality of BBUs, and the high-altitude device is an RRU, a repeater, or an antenna.

In the technical solution provided in this embodiment of the present invention, the high-altitude device may determine, according to a real-time wind speed change, whether the beam coverage radius needs to be recalculated, so that the ground device can dynamically adjust the beam width according to the beam coverage radius and a link between the ground device and the high-altitude device has more stable quality.

Figure 12:
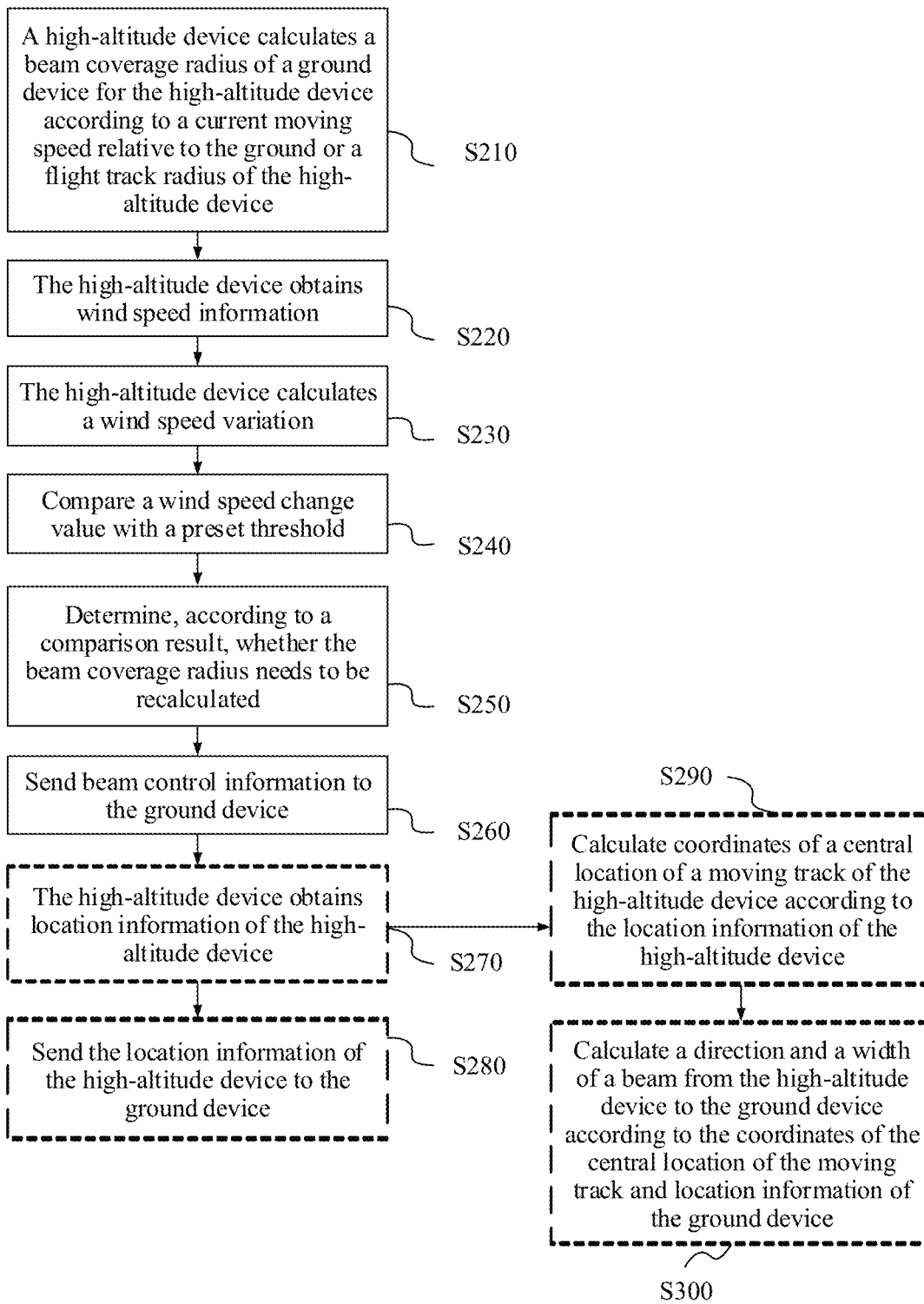
FIG. 12 is a flowchart of a communication method according to an embodiment of the present invention.

As shown in FIG. 12, an embodiment of the present invention provides an air-ground communication control method. The method is applied to a hierarchical network that includes a ground network and at least one aerial network, and the method includes:

S210. A high-altitude device calculates a beam coverage radius of a ground device for the high-altitude device according to a current moving speed relative to the ground or a flight track radius of the high-altitude device, where the flight track radius of the high-altitude device is calculated according to location information of the high-altitude device, the beam coverage radius is used to calculate a width of a beam from the ground device to the high-altitude device, the ground device is located in the ground network, the high-altitude device is located in the aerial network, and a beam of the high-altitude device covers the ground device.

S220. The high-altitude device obtains wind speed information, where the wind speed information indicates an instantaneous wind speed obtained by the high-altitude device.

S230. The high-altitude device calculates a wind speed variation, where the wind speed variation is a vector including a wind speed change value and a direction, and the wind speed variation is used to indicate a variation between a current instantaneous wind speed and a previously obtained average wind speed in a time period.

S240. Compare the wind speed change value with a preset threshold.

S250. Determine, according to a comparison result, whether the beam coverage radius needs to be recalculated.

S260. Send beam control information to the ground device, where the beam control information includes at least the beam coverage radius.

Optionally, as shown in FIG. 12, the method further includes:

S270. The high-altitude device obtains the location information of the high-altitude device.

S280. Send the location information of the high-altitude device to the ground device.

Optionally, step S250 of determining, according to a comparison result, whether the beam coverage radius needs to be recalculated includes:

S251. If the wind speed change value is greater than or equal to the preset threshold, recalculate the beam coverage radius.

Optionally, step S251 includes:

S2510. Calculate a new moving speed of the high-altitude device relative to the ground according to the wind speed variation and the current moving speed of the high-altitude device relative to the ground.

S2511. Recalculate the beam coverage radius according to the new moving speed relative to the ground.

S252 If the wind speed change value is less than or equal to the preset threshold, skip recalculating the beam coverage radius.

Optionally, as shown in FIG. 12, the method further includes:

S290. Calculate coordinates of a central location of a moving track of the high-altitude device according to the location information of the high-altitude device.

S300. Calculate a direction and a width of a beam from the high-altitude device to the ground device according to the coordinates of the central location of the moving track and location information of the ground device.

Optionally, step S300 includes:

1. Calculate a distance between the ground device and the central location of the moving track according to the coordinates of the central location of the moving track and the location information of the ground device.

2. Calculate the beam direction according to the distance between the ground device and the central location of the moving track, the coordinates of the central location of the moving track, and the location information of the ground device.

3. Calculate a radius of the moving track according to the location information of the high-altitude device.

4. Calculate beam width information according to the distance between the ground device and the central location of the moving track, a first preset value, the coordinates of the central location of the moving track, and the location information of the ground device, where the first preset value is greater than or equal to the radius of the moving track.

In another possible implementation, optionally, step S300 includes:

1. Calculate a radius of the moving track according to the location information of the high-altitude device.

2. Calculate a distance between the ground device and the high-altitude device according to the location information of the ground device and the location information of the high-altitude device.

3. Calculate the beam direction according to the distance between the ground device and the high-altitude device, the location information of the high-altitude device, and the location information of the ground device.

4. Calculate beam width information according to the distance between the ground device and the high-altitude device, a second preset value, the location information of the high-altitude device, and the location information of the ground device, where the second preset value is greater than zero and less than or equal to the radius of the moving track.

Optionally, the ground device is a BBU or a cloud baseband unit, the cloud baseband unit includes a plurality of BBUs, and the high-altitude device is an RRU, a repeater, or a reflector antenna.

In the technical solution provided in this embodiment of the present invention, the high-altitude device may determine, according to a real-time wind speed change, whether the beam coverage radius needs to be recalculated, so that the ground device can dynamically adjust the beam width according to the beam coverage radius and a link between the ground device and the high-altitude device has more stable quality.

A radio access network (RAN) is an important asset for a mobile operator to live on, and can provide users with uninterrupted and high-quality data services 7×24 hours. A conventional radio access network has the following characteristics: 1. Each base station is connected to a fixed quantity of sector antennas, and covers a small area, and each base station can process only signals received and sent in a cell the base station covers. 2. A system capacity is restricted by interference, and therefore spectral efficiency is difficult to increase when each base station works independently. These characteristics bring the following challenges: A large quantity of base stations mean high costs in construction investment, site facilities, site leasing and maintenance, and building more base stations means more capital expenses and operating expenses. In addition, actual utilization of an existing base station is still quite low, average load of a network is generally much lower than load during busy hours, and different base stations cannot share a processing capability. Therefore, spectral efficiency is difficult to increase.

A C-RAN is a cooperative wireless network that includes a cloud baseband unit, an RRU, and an antenna. The cloud baseband unit includes a plurality of BBUs. Essence of the C-RAN is to reduce a quantity of base station equipment rooms, reduce energy consumption, and use a cooperative virtualization technology to implement resource sharing and dynamic scheduling and improve spectral efficiency, to implement low-cost, high-bandwidth, and high-flexibility operation.

Because BBUs are centralized for processing, device power consumption, a volume, and a weight of the cloud baseband unit also increase significantly compared with those of a conventional distributed base station, and the cloud baseband unit is difficult to carry to air by using a high-altitude platform. In the present invention, a lightweight front-end platform device is carried to air by using a high-altitude platform, to implement effective combination with a C-RAN architecture.

A powered high-altitude platform (such as an airship or a drone) carries a lightweight front-end platform device to rise to air, to implement camping in air, that is, moving through flying within a specific range. The ground device includes a ground heavyweight processing platform device and an antenna, and the antenna is used for wireless communication between the ground heavyweight processing platform device and the lightweight front-end platform device.

The lightweight front-end platform device may be an RRU, a repeater, or a reflector antenna. The ground heavyweight processing platform device may be a BBU, a cloud baseband unit, or a base station.

For ease of description, the following provides detailed description by using a high-altitude RRU and a ground BBU as an example.

Figure 1A:
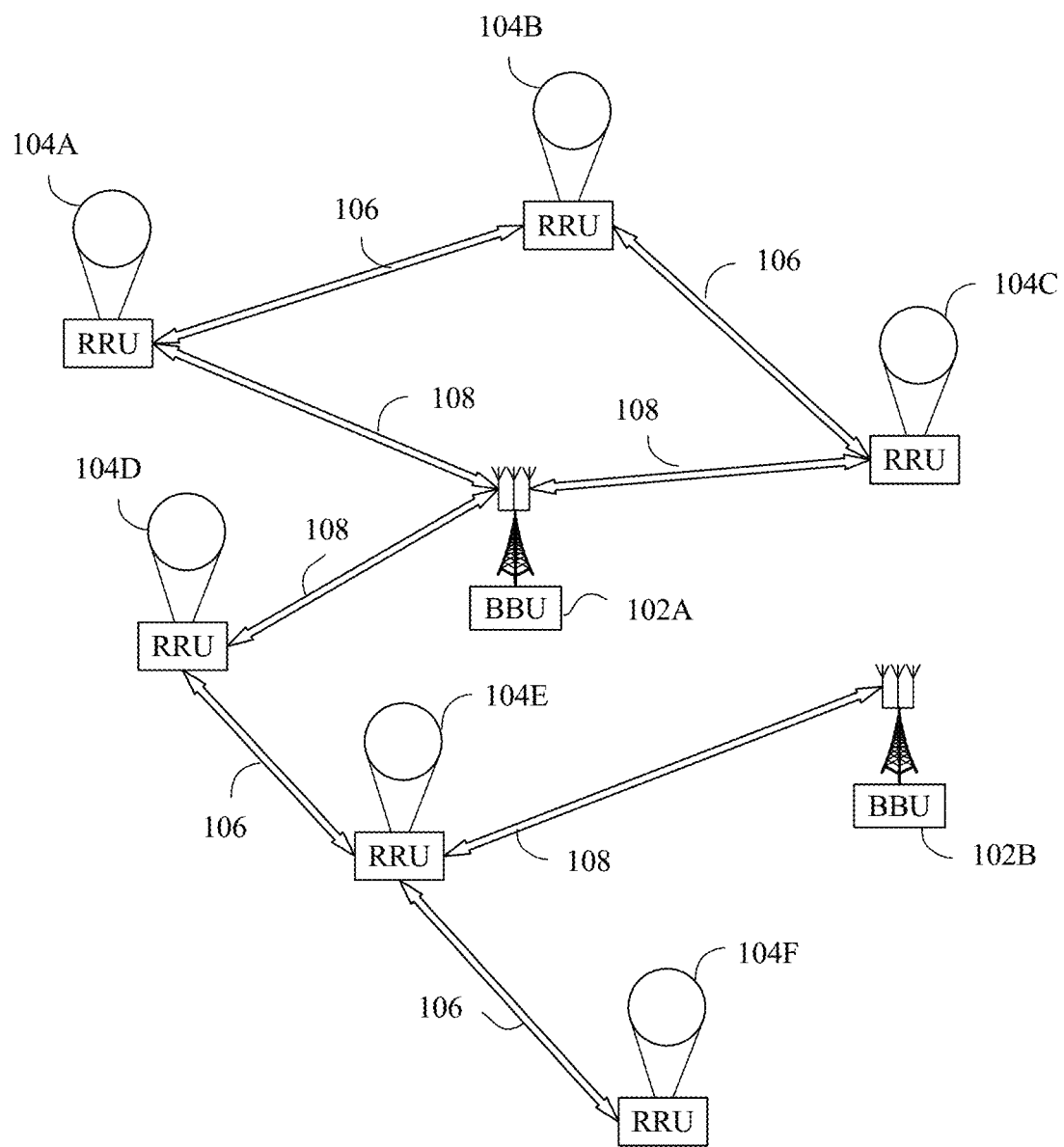
FIG. 1A is a schematic diagram of a distributed high-altitude platform communications system according to an embodiment of the present invention.

FIG. 1A is a schematic diagram of a distributed high-altitude platform communications system according to an embodiment of the present invention. As shown in FIG. 1A, the communications system includes a plurality of BBUs (Baseband Unit) 102A and 102B, and a plurality of RRUs (Remote Radio Unit) 104A to 104F. The baseband units 102A and 102B are BBUs deployed on the ground, and are powered by a ground power supply system according to a configuration. The remote radio units 104A to 104F are high-altitude RRUs deployed in the stratosphere by using a high-altitude platform, and are powered by a high-altitude solar power system according to a configuration. More specifically, in the distributed high-altitude platform communications system, the high-altitude RRUs 104A to 104F may usually be configured to perform operations at an altitude of 18 km to 25 km (or at another altitude). This altitude range may be beneficial due to many reasons. Specifically, the stratosphere generally has a relatively low wind speed (for example, a wind speed of 5 m/s to 40 m/s) and relatively small turbulence. In addition, an altitude higher than 18 km generally exceeds a maximum altitude specified for a commercial plane. Therefore, when deployed at an altitude of 18 km to 25 km, a high-altitude platform does not cause much interference to a commercial plane.

In this embodiment of the present invention, the high-altitude RRUs 104A to 104F are configured to communicate with each other by using a free space link 106. Specifically, the free space link 106 includes at least one of a free space optical link or a microwave link. For example, the specified high-altitude RRUs 104A to 104F may send optical signals by using a laser, to communicate with other high-altitude RRUs 104A to 104F, and another type of free space optics communication is possible. For another example, the specified high-altitude RRUs 104A to 104F may send electromagnetic wave signals by using a millimeter wave, to communicate with other high-altitude RRUs 104A to 104F, and another type of microwave communication is possible. The specified high-altitude RRUs 104A to 104F may be configured to communicate with other high-altitude RRUs 104A to 104F by using a wireless common public radio interface (CPRI) protocol, a dedicated wireless fronthaul protocol developed for high altitude-to-high altitude, or the like.

In this embodiment of the present invention, the high-altitude RRUs 104A to 104F are configured to communicate with the ground BBUs 102A and 102B by using a free space link 108. Specifically, the free space link 108 includes at least one of a free space optical link and a microwave link. For example, the specified high-altitude RRUs 104A to 104F may send optical signals by using a laser, to communicate with the ground BBUs 102A and 102B, and another type of free space optics communication is possible. For another example, the specified high-altitude RRUs 104A to 104F may send electromagnetic wave signals by using a millimeter wave, to communicate with the ground BBUs 102A and 102B, and another type of microwave communication is possible. The specified high-altitude RRUs 104A to 104F may be configured to communicate with the ground BBUs 102A and 102B by using a wireless CPRI protocol, a dedicated wireless fronthaul protocol developed for high altitude-to-ground, or the like.

Figure 1B:
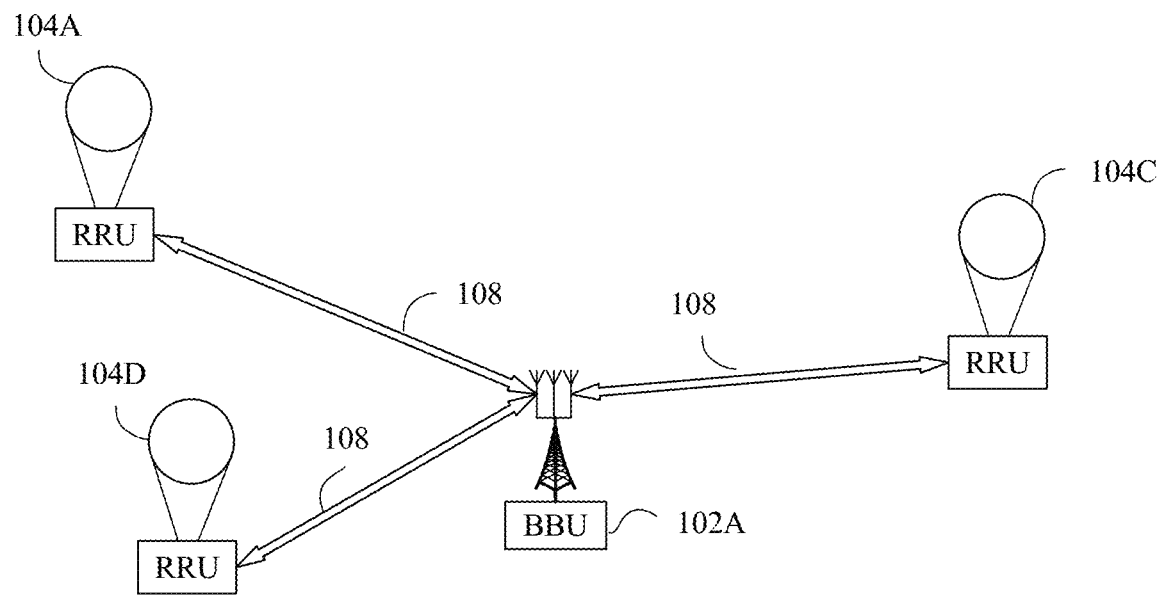
FIG. 1B is a schematic structural diagram of star networking according to an embodiment of the present invention.

In this embodiment of the present invention, the high-altitude RRUs 104A to 104F are configured to include at least one of the free space link 106 and the free space link 108. On one hand, there may be the following scenario: Some of the specified high-altitude RRUs 104A to 104F are configured to communicate with one of the specified ground BBUs 102A and 102B by using the free space link 108, thereby forming a star network structure, which is shown in FIG. 1B. For example, the high-altitude RRU 104A is configured to communicate with the ground BBU 102A by using the free space link 108, the high-altitude RRU 104C is configured to communicate with the ground BBU 102A by using the free space link 108, and the high-altitude RRU 104D is configured to communicate with the ground BBU 102A by using the free space link 108, and the high-altitude RRU 104A, the high-altitude RRU 104C, the high-altitude RRU 104D, and the ground BBU 102A form a star network structure.

Figure 1C:
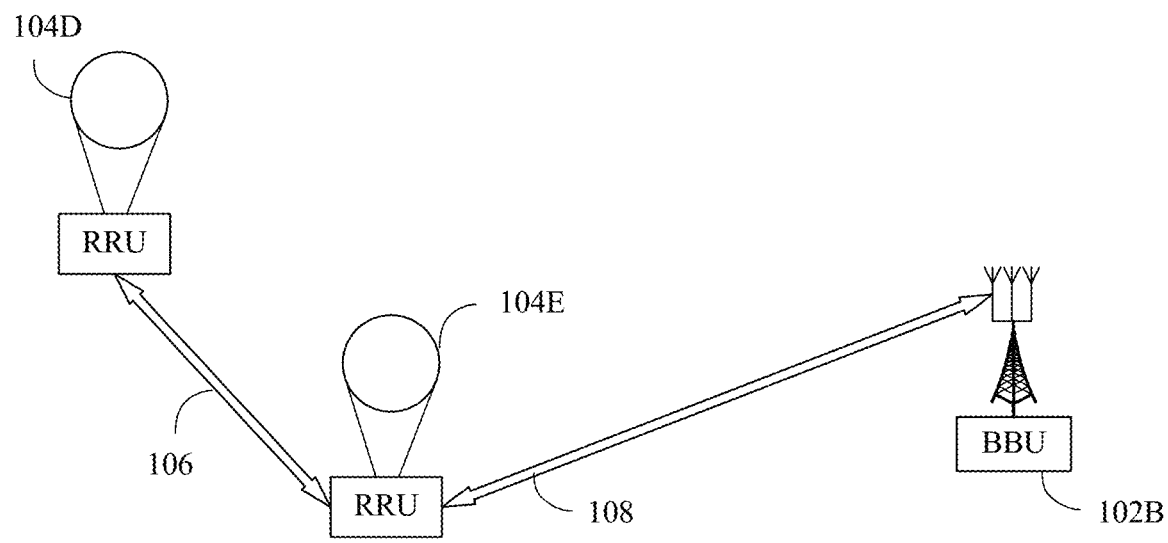
FIG. 1C is a schematic structural diagram of chain networking according to an embodiment of the present invention.
Figure 1D:
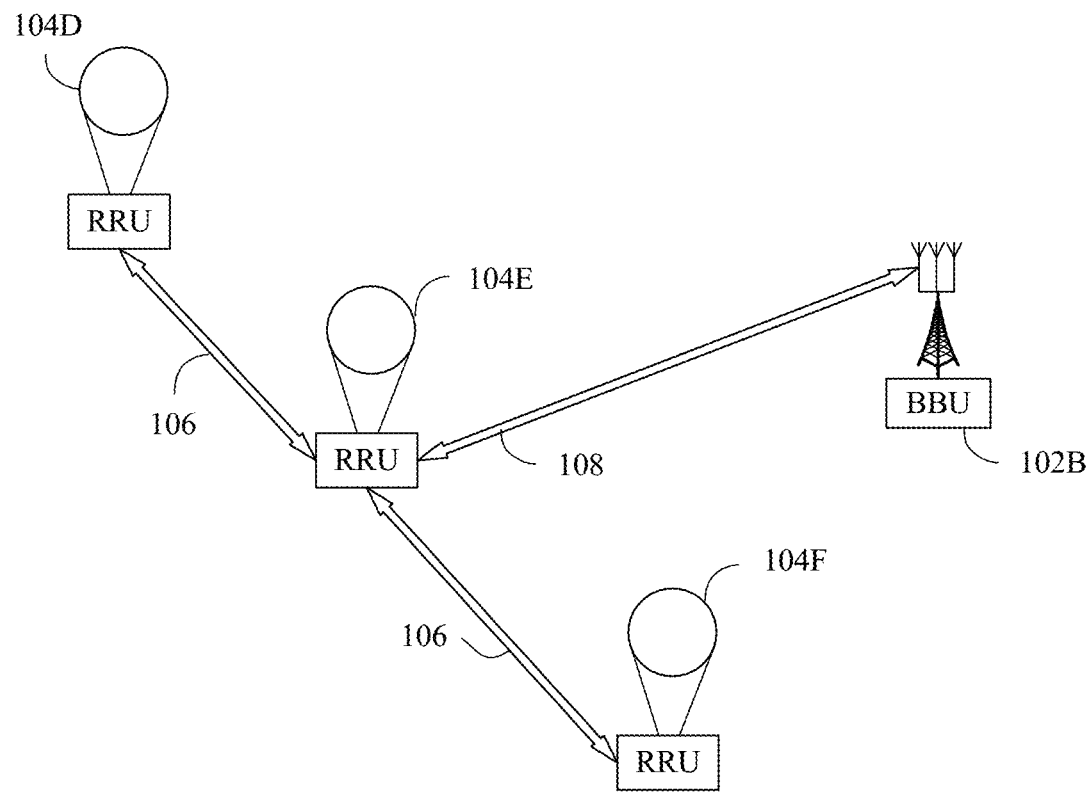
FIG. 1D is a schematic structural diagram of tree networking according to an embodiment of the present invention.

On another hand, one specified high-altitude RRU in the plurality of specified high-altitude RRUs 104A to 104F is configured to communicate with one of the specified ground BBUs 102A and 102B by using the free space link 108, and the plurality of specified high-altitude RRUs are configured to communicate with each other by using the free space link 106, thereby forming a chain network structure, which is shown in FIG. 1C. For example, the high-altitude RRU 104E is configured to communicate with the ground BBU 102B by using the free space link 108, and the high-altitude RRU 104D is configured to communicate with the high-altitude RRU 104E by using the free space link 106, and the high-altitude RRU 104D, the high-altitude RRU 104E, and the ground BBU 102B form a chain network structure. In addition, a tree network structure shown in FIG. 1D may be formed. For example, the high-altitude RRU 104E is configured to communicate with the ground BBU 102B by using the free space link 108, the high-altitude RRU 104D is configured to communicate with the high-altitude RRU 104E by using the free space link 106, and the high-altitude RRU 104F is configured to communicate with the high-altitude 104E by using the free space link 106, and the high-altitude RRU 104D, the high-altitude RRU 104E, the high-altitude RRU 104F, and the ground BBU 102B form a tree network structure.

Figure 1E:
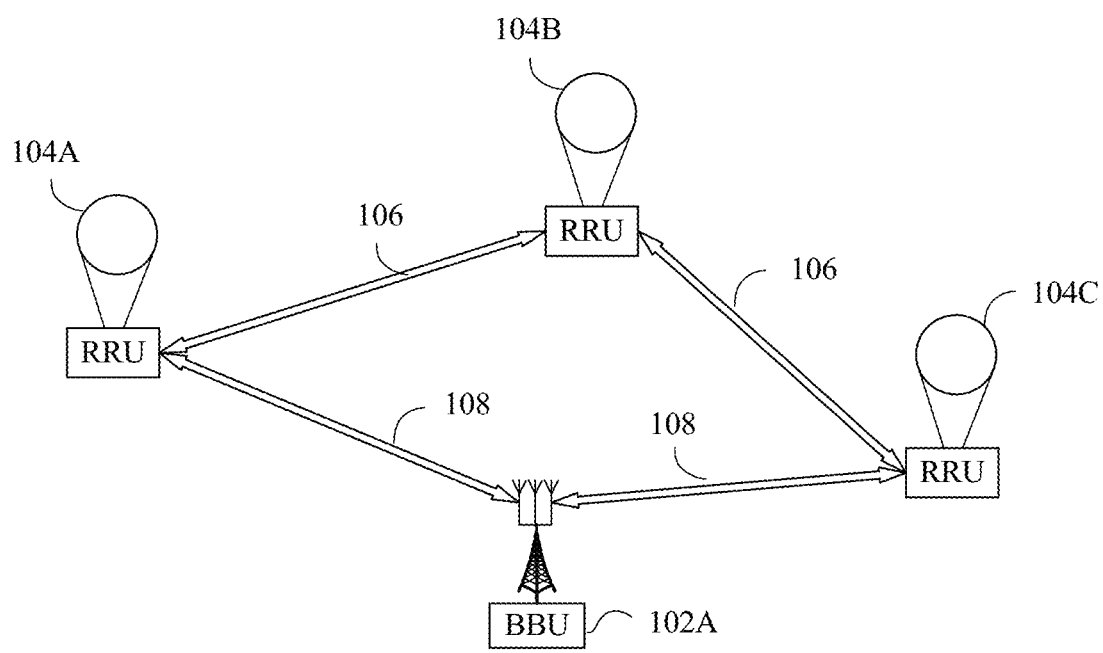
FIG. 1E is a schematic structural diagram of ring networking according to an embodiment of the present invention.

On still another hand, two specified high-altitude RRUs in the plurality of specified high-altitude RRUs 104A to 104F are configured to communicate with one of the specified ground BBUs 102A and 102B by using the free space link 108, and the plurality of specified high-altitude RRUs are configured to communicate with each other by using the free space link 106, thereby forming a ring network structure, which is shown in FIG. 1E. For example, the high-altitude RRU 104A is configured to communicate with the ground BBU 102A by using the free space link 108, the high-altitude RRU 104C is configured to communicate with the ground BBU 102A by using the free space link 108, and the high-altitude RRU 104B is configured to communicate with the high-altitude RRU 104A and the high-altitude RRU 104C by using the free space link 106, and the high-altitude RRU 104A, the high-altitude RRU 104B, the high-altitude RRU 104C, and the ground BBU 102A form a ring network structure.

A high-altitude RRU continuously moves, instead of staying at a specific location. When a wind speed is stable, the high-altitude RRU may roughly fly along a track with a radius R and a central location under the control of a flight control system. The high-altitude RRU may control a moving speed to keep a moving rate stable relative to the ground. When the wind speed is unstable, for example, when there is atmospheric turbulence or the like, the wind speed and a wind direction change, and consequently, the moving rate of the high-altitude RRU relative to the ground changes. To prevent a free space link between the high-altitude RRU and a ground BBU from being interrupted because the high-altitude RRU flies out of a beam coverage area, a beam width needs to be adjusted based on the wind speed change.

It should be noted that beam information may be calculated by the high-altitude RRU or the ground BBU. The following separately uses the high-altitude RRU and the ground BBU for description.

Figure 2:
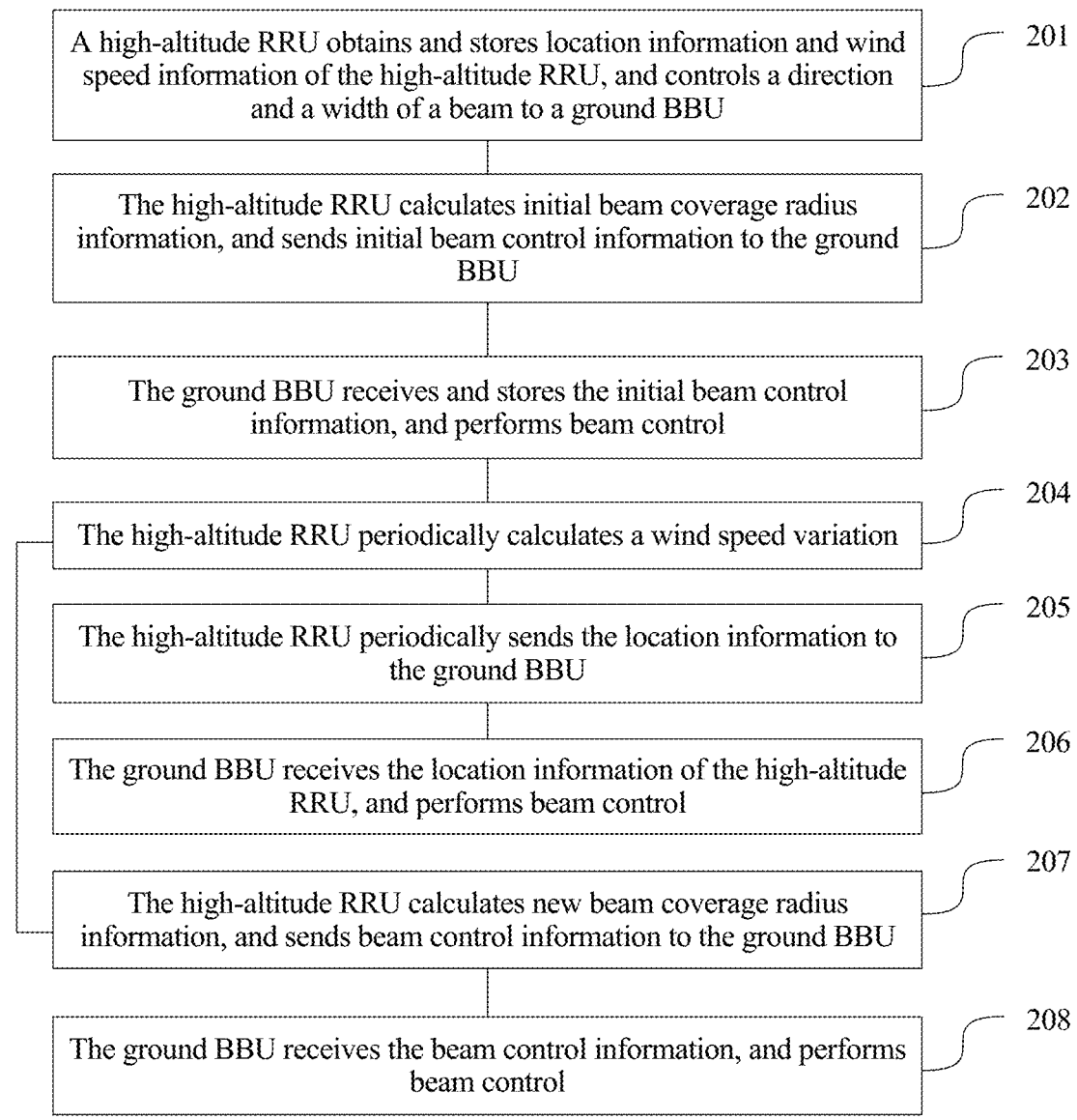
FIG. 2 is a flowchart of a communication method according to an embodiment of the present invention.

FIG. 2 is a flowchart of a communication control method according to an embodiment of the present invention. Beam information is calculated by a high-altitude RRU. Referring to FIG. 2, the method includes the following operations.

201. The high-altitude RRU obtains and stores location information and wind speed information of the high-altitude RRU, and controls a direction and a width of a beam to a ground BBU.

The high-altitude RRU is configured to periodically obtain the location information of the high-altitude RRU. Specifically, the location information is information about three-dimensional coordinates (x,y,z). A specific obtaining method is not limited in this embodiment of the present invention. The high-altitude RRU is configured to periodically obtain the wind speed information. Specifically, the wind speed information includes a rate and a direction. A specific obtaining method is not limited in this embodiment of the present invention.

In one or more flight cycles, a plurality of pieces of location information are obtained, the location information is stored, and a flight track is calculated. A method for obtaining the flight track may be:

calculating a central point $(x_0, y_0, z_0)$ of the flight track according to the following formula 1, where $(x_i, y_i, z_i)$ represents an $i^{th}$ piece of obtained location information, and represents a multiplication operation;

$$\begin{cases} x_0 = \frac{1}{N} \cdot \sum_{i=1}^{N} x_i \\ y_0 = \frac{1}{N} \cdot \sum_{i=1}^{N} y_i \\ z_0 = \frac{1}{N} \cdot \sum_{i=1}^{N} z_i \end{cases} \quad (1)$$

and calculating a radius R of the flight track according to the following formula 2.

$$R = \frac{1}{N} \cdot \sum_{i=1}^{N} \sqrt[2]{(x_i - x_0)^2 + (y_i - y_0)^2 + (z_i - z_0)^2} \quad (2)$$

In this embodiment of the present invention, the ground BBU does not move, and location information $(x_b, y_b, z_b)$ of the ground BBU is known to the high-altitude RRU and may be pre-stored in the high-altitude RRU.

Initial beam control performed by the high-altitude RRU on the ground BBU may include the following three cases.

Figure 3A:
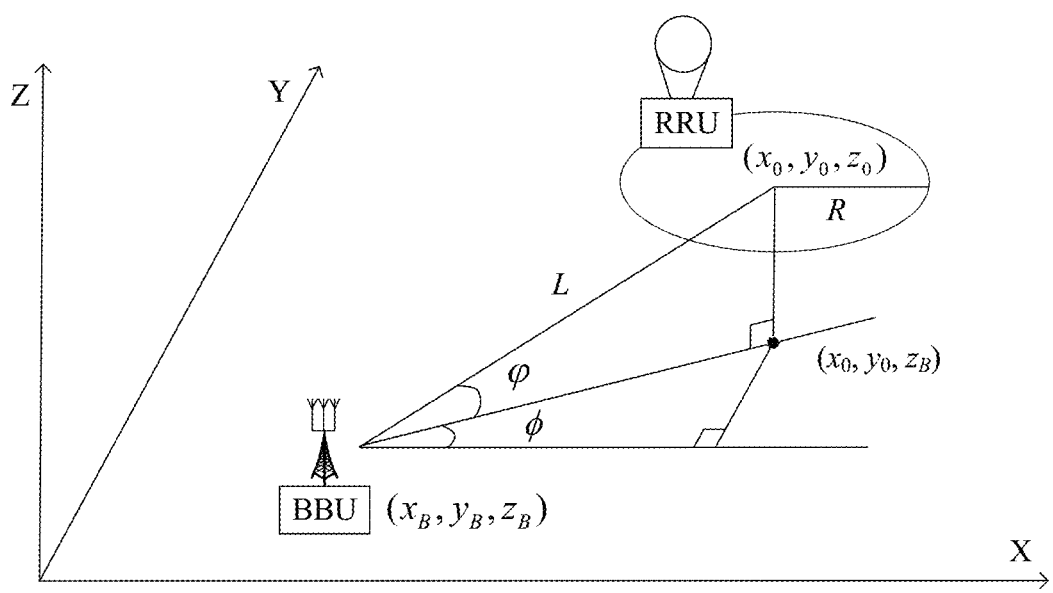
FIG. 3A is a schematic diagram of a beam direction obtaining method according to an embodiment of the present invention.

In a first case, when expecting infrequent beam direction control, the high-altitude RRU requires that the beam width may include a flight range of the high-altitude RRU, so that the high-altitude RRU does not need to adjust the beam direction or the beam width at any point on the flight track. The high-altitude RRU can avoid frequent beam direction control and reduce power consumption of the high-altitude RRU, but an antenna gain is reduced. As shown in FIG. 3A, a method for obtaining the beam direction may be as follows.

The high-altitude RRU may calculate a distance L between the ground BBU and the central point of the flight track according to the following formula 3, where $(x_B, y_B, z_B)$ is a location of the ground BBU, and $(x_0, y_0, z_0)$ is a location of the central point of the flight track.

$$L = \sqrt[2]{(x_B - x_0)^2 + (y_B - y_0)^2 + (z_B - z_0)^2} \tag{3}$$

The beam direction is determined based on a horizontal azimuth $\phi$ and a vertical azimuth $\varphi$ of a beam. The high-altitude RRU may calculate the horizontal azimuth $\phi$ and the vertical azimuth $\varphi$ of the beam according to the following formula 4.

$$\begin{cases} \phi = \arctan\left(\dfrac{y_0 - y_B}{x_0 - x_B}\right) \\ \varphi = \arcsin\left(\dfrac{z_0 - z_B}{L}\right) \end{cases} \tag{4}$$

Figure 3B:
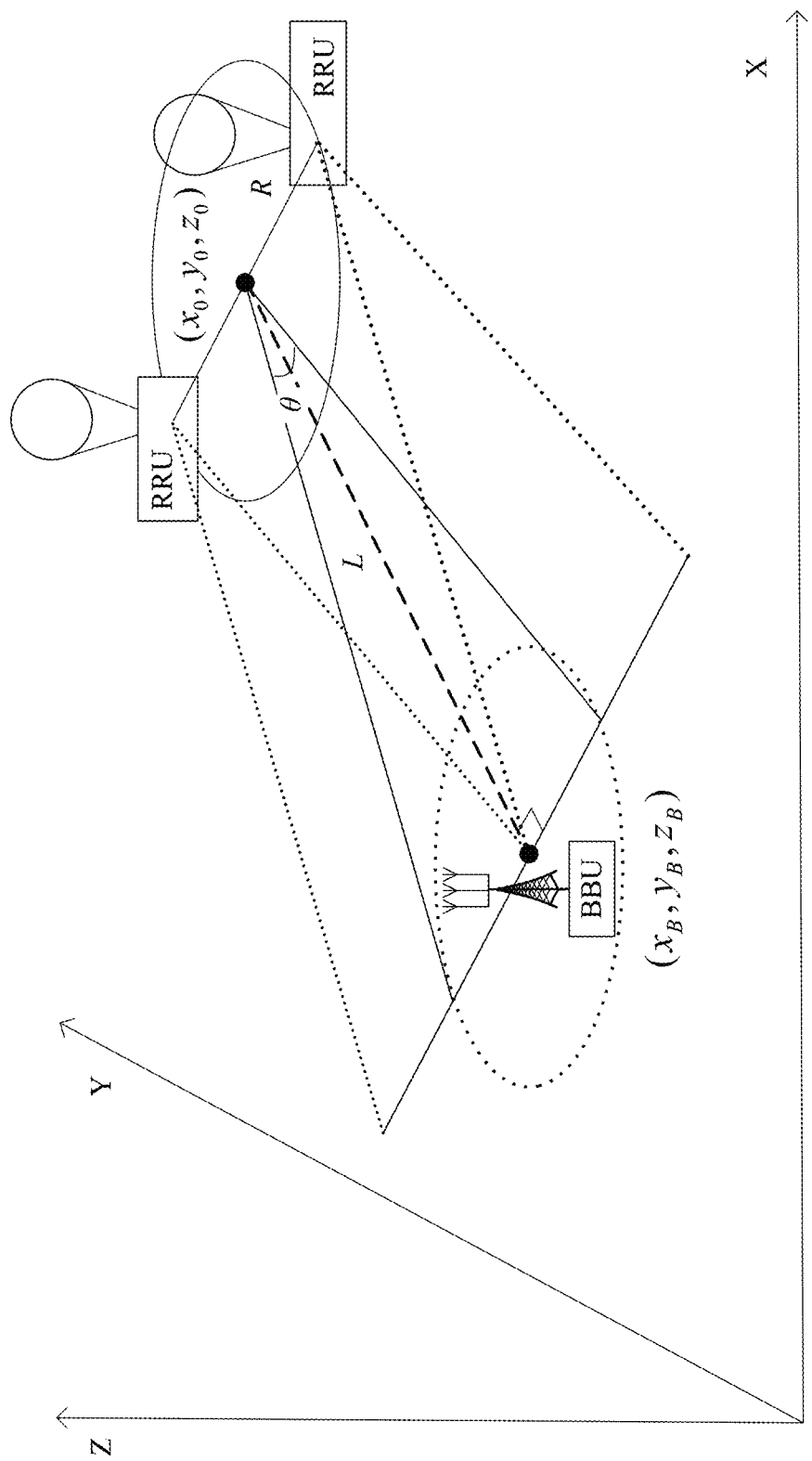
FIG. 3B is a schematic diagram of a method for obtaining a horizontal lobe angle of a beam according to an embodiment of the present invention.

In this embodiment of the present invention, after determining the beam direction, the high-altitude RRU calculates the beam width. The beam width is determined based on a horizontal lobe angle $\theta$ and a vertical lobe angle $\psi$. As shown in FIG. 3B, a method for obtaining a horizontal lobe angle of a beam may be as follows.

The high-altitude RRU may calculate the horizontal lobe angle $\theta$ of the beam according to the following formula 5.

$$\theta = 2 \cdot \arctan\left(\dfrac{L_1}{L}\right) \tag{5}$$

$L_1$ is a first preset value ($L_1 \geq R$, and R is the radius of the flight track). It should be noted that $L_1$ may be the radius of the flight track, or may be a value greater than the radius of the flight track.

Figure 3C:
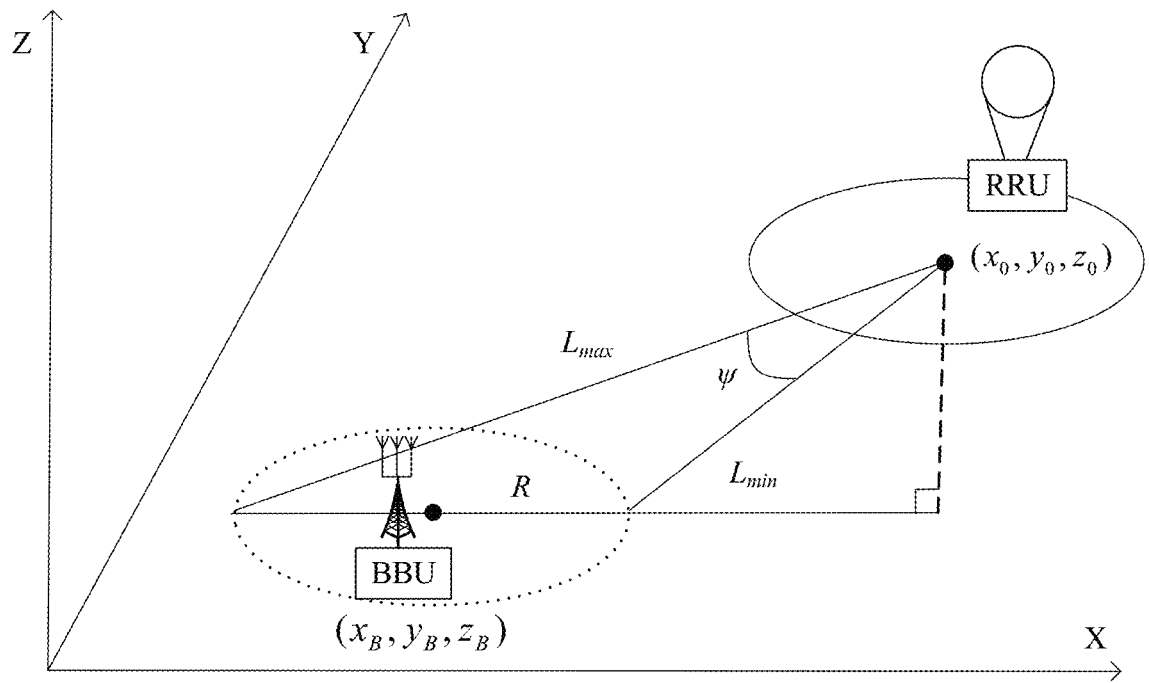
FIG. 3C is a schematic diagram of a method for obtaining a vertical lobe angle of a beam according to an embodiment of the present invention.

As shown in FIG. 3C, a method for obtaining a vertical lobe angle of a beam may be as follows.

The high-altitude RRU may calculate the vertical lobe angle $\psi$ of the beam according to the following formula 6.

$$\psi = \arctan\left(\dfrac{\sqrt[2]{(x_B - x_0)^2 + (y_B - y_0)^2} + L_1}{z_0 - z_B}\right) - \arctan\left(\dfrac{\sqrt[2]{(x_B - x_0)^2 + (y_B - y_0)^2} - L_1}{z_0 - z_B}\right) \tag{6}$$

According to the foregoing methods for calculating the beam direction and the beam width, the high-altitude RRU can control a signal beam to the ground BBU.

Figure 3D:
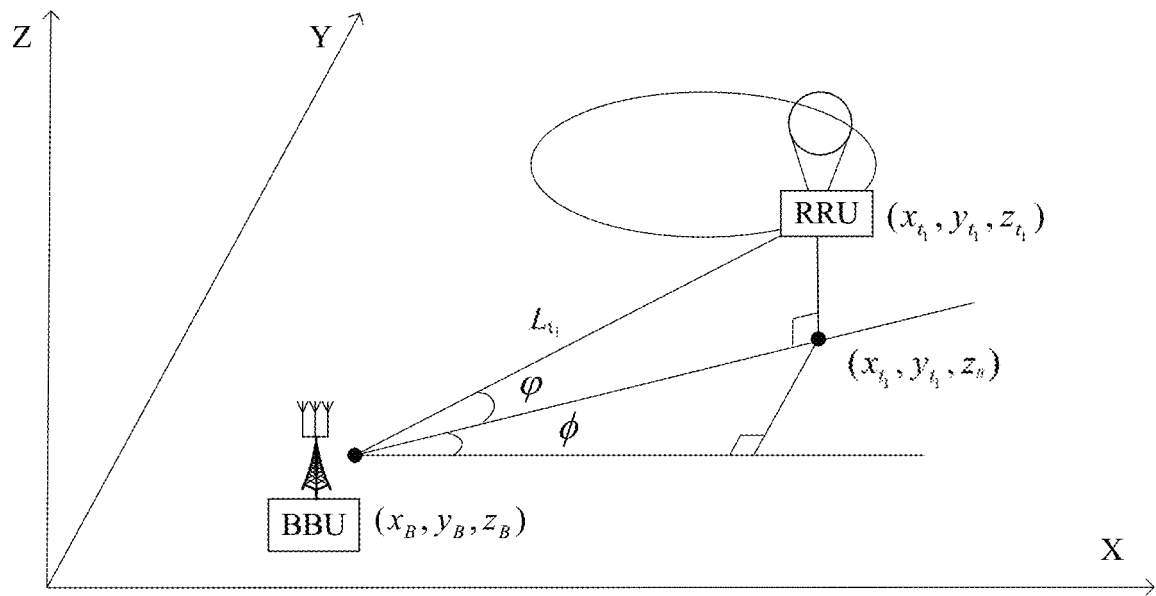
FIG. 3D is a schematic diagram of another beam direction obtaining method according to an embodiment of the present invention.

In a second case, when frequent beam direction control is expected, a beam coverage area may cover only the ground BBU, to obtain a higher antenna gain, but power consumption of the high-altitude RRU is increased. As shown in FIG. 3D, a method for obtaining the beam direction may be as follows.

At a moment $t_1$, a location of the high-altitude RRU is $(x_{t_1}, y_{t_1}, z_{t_1})$, and the high-altitude RRU may calculate a distance $L_{t_1}$ between the ground BBU and the high-altitude RRU according to the following formula 7, where $(x_B, y_B, z_B)$ is a location of the ground BBU.

$$L_{t_1} = \sqrt[2]{(x_B - x_{t_1})^2 + (y_B - y_{t_1})^2 + (z_B - z_{t_1})^2} \tag{7}$$

The beam direction is determined based on a horizontal azimuth $\phi$ and a vertical azimuth $\varphi$ of a beam. The high-altitude RRU may calculate the horizontal azimuth $\phi$ and the vertical azimuth $\varphi$ of the beam according to the following formula 8.

$$\begin{cases} \phi = \arctan\left(\dfrac{y_{t_1} - y_B}{x_{t_1} - x_B}\right) \\ \varphi = \arcsin\left(\dfrac{z_{t_1} - z_B}{L_{t_1}}\right) \end{cases} \tag{8}$$

Figure 3E:
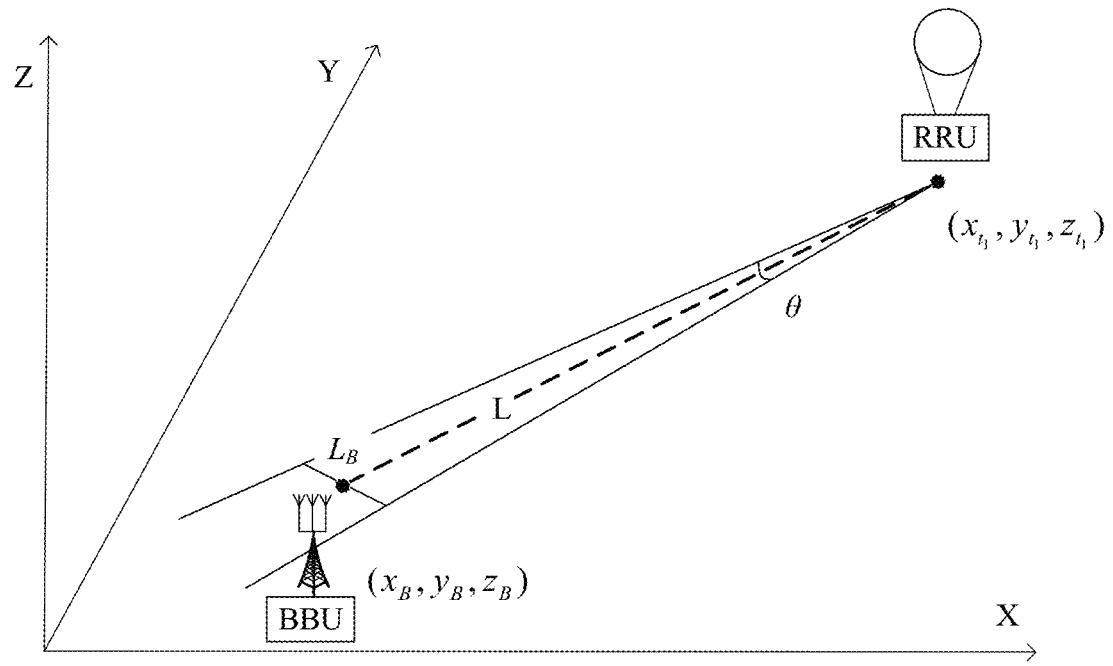
FIG. 3E is a schematic diagram of another method for obtaining a horizontal lobe angle of a beam according to an embodiment of the present invention.

In this embodiment of the present invention, after determining the beam direction, the high-altitude RRU calculates the beam width. The beam width is determined based on a horizontal lobe angle $\theta$ and a vertical lobe angle $\psi$. As shown in FIG. 3E, a method for obtaining a horizontal lobe angle of a beam may be as follows.

The high-altitude RRU may calculate the horizontal lobe angle $\theta$ of the beam according to the following formula 9.

$$\theta = 2 \cdot \arctan\left(\dfrac{L_2}{L_{t_1}}\right) \tag{9}$$

$L_2$ is a second preset value ($0 < L_2 \leq R$, and R is the radius of the flight track). It should be noted that the ground BBU device includes an antenna system, and $L_2$ may be a size of the ground BBU, or may be a size of the antenna system, or may be a value greater than the size of the ground BBU.

Figure 3F:
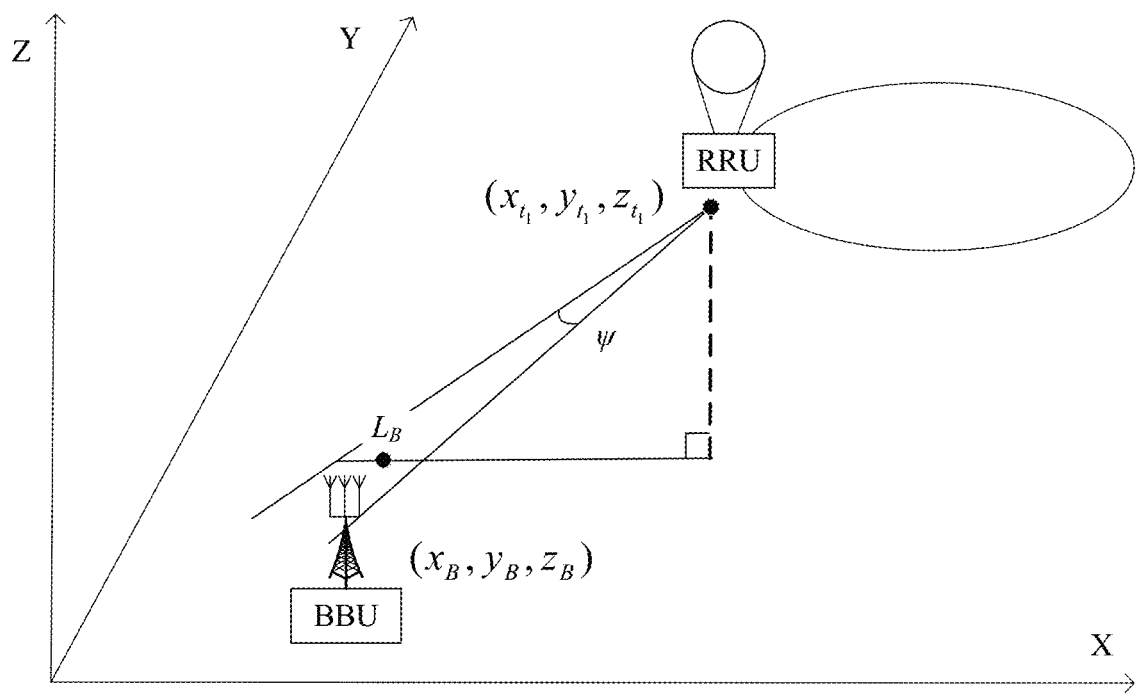
FIG. 3F is a schematic diagram of another method for obtaining a vertical lobe angle of a beam according to an embodiment of the present invention.

As shown in FIG. 3F, a method for obtaining a vertical lobe angle of a beam may be as follows.

It should be noted that a value of the vertical lobe angle $\psi$ of the beam varies according to different locations of the high-altitude RRU.

The high-altitude RRU may calculate the vertical lobe angle $\psi$ of the beam according to the following formula 10.

$$\psi_{t_1} = \arctan\left(\dfrac{\sqrt[2]{(x_B - x_{t_1})^2 + (y_B - y_{t_1})^2} + L_2}{z_{t_1} - z_B}\right) - \arctan\left(\dfrac{\sqrt[2]{(x_B - x_{t_1})^2 + (y_B - y_{t_1})^2} - L_2}{z_{t_1} - z_B}\right) \tag{10}$$

In a third case, the high-altitude RRU does not need to calculate the beam direction or the beam width in an initial phase. The high-altitude RRU provides a wide coverage area based on a preset beam direction and a preset beam width. In this way, calculation load of the high-altitude RRU can be reduced, but an antenna gain is relatively low. For example, the beam direction of the high-altitude RRU may be a direction perpendicular to the ground, and the beam width may be 180 degrees. This can ensure that the ground BBU can receive information from the high-altitude RRU within a preset distance. It should be noted that another beam direction and another beam width are also acceptable.

In addition, the high-altitude RRU is affected by turbulence to jolt or jitter, causing a change of the beam direction. The high-altitude RRU is configured to periodically obtain the posture information of the high-altitude RRU. The high-altitude RRU compensates for a horizontal azimuth φ and a vertical azimuth φ of a beam based on the posture information, so that the beam direction aims at the ground BBU. Specifically, the posture information may be information about polar coordinates, or may be other information. A specific calculation method is not specifically limited in this embodiment of the present invention.

In one or more flight cycles, a plurality of pieces of wind speed information $$[\vec{V}(1) \quad \vec{V}(2) \quad L \quad \vec{V}(n)]$$

are obtained, the wind speed information is stored, and an average wind speed $\vec{V}_w$ is calculated. The average wind speed may be periodically updated, for example, updated every hour, every day, or the like.

A moving speed $\vec{V}$ of the high-altitude RRU relative to the ground may be calculated according to coordinate values and a time difference of two locations, and includes a rate value and an azimuth. For example, at a moment $t_1$, the location of the high-altitude RRU is $(x_{t_1}, y_{t_1})$, and at a moment $t_2$, the location of the high-altitude RRU is $(x_{t_2}, y_{t_2})$. An average rate and an azimuth in a time period between $t_1$ and $t_2$ are calculated according to the following formula 11.

$$\begin{cases} v_i = \dfrac{\sqrt[2]{(x_{t_2} - x_{t_1})^2 + (y_{t_2} - y_{t_1})^2}}{t_2 - t_1} \\ \alpha_i = \arcsin\left(\dfrac{y_{t_2} - y_{t_1}}{x_{t_2} - x_{t_1}}\right) \end{cases} \quad (11)$$

In one or more flight cycles, an average rate v relative to the ground is calculated according to a plurality of moving rates relative to the ground.

It should be noted that the ground BBU may further calculate a maximum moving rate value according to different location information and time information of the high-altitude RRU.

202. The high-altitude RRU calculates initial beam coverage radius information, and sends initial beam control information to the ground BBU.

A method used by the high-altitude RRU to calculate the initial beam coverage radius varies according to different information sending frequencies expected by the high-altitude RRU, and may specifically include the following two cases.

In a first case, when the high-altitude RRU expects to send the location information to the ground BBU at a relatively low frequency, the high-altitude RRU expects that a coverage area of a beam from the ground BBU to the high-altitude RRU is relatively large and can cover the flight track of the high-altitude RRU, and the high-altitude RRU sends the location information to the ground BBU only in a specific condition. The initial beam coverage radius r of the beam from the ground BBU to the high-altitude RRU is equal to the flight track radius R of the high-altitude RRU.

In a second case, when the high-altitude RRU expects to send the location information to the ground BBU at a relatively high frequency, the high-altitude RRU expects that a coverage area of a beam from the ground BBU to the high-altitude RRU is relatively small and cannot cover the flight track of the high-altitude RRU. The high-altitude RRU may calculate the initial beam coverage radius r of the beam from the ground BBU to the high-altitude RRU according to the following formula 12, where T represents a time cycle, and v represents the average rate of the high-altitude RRU relative to the ground.

$$r = T*v \quad (12)$$

Specifically, the cycle T may be a cycle in which the high-altitude RRU obtains the location information of the high-altitude RRU, or a cycle in which the high-altitude RRU obtains the wind speed information, or another preset cycle. It should be noted that a value of the cycle T is not limited herein.

Optionally, the cycle T may alternatively be sent by the ground BBU to the high-altitude RRU.

The high-altitude RRU sends the initial beam control information to the ground BBU, so that the ground BBU performs beam control based on the initial beam control information. Specifically, the initial beam control information includes the location information or flight track central location information, the initial beam coverage radius information, and the flight track radius of the high-altitude RRU.

203. The ground BBU receives and stores the initial beam control information, and performs beam control.

The initial beam control information includes the location information or flight track central location information, the initial beam coverage radius information, and the flight track radius.

The method used by the ground BBU to calculate the beam direction and the beam width according to the received initial beam control information may specifically include the following two cases.

In a first case, when the initial beam coverage radius is greater than or equal to the flight track radius, the beam from the ground BBU to the high-altitude RRU covers the flight track of the high-altitude RRU.

The initial beam control information includes the initial beam coverage radius information and the flight track central location information of the high-altitude RRU. The ground BBU performs beam control based on the flight track central location information of the high-altitude RRU and the initial beam coverage radius information. As shown in FIG. 3A, a method for obtaining the beam direction may be as follows.

The ground BBU receives and stores N(N≥3) pieces of location information. The ground BBU calculates the central point $(x_0, y_0, z_0)$ and the radius R that are of the flight track of the high-altitude RRU according to the foregoing formulas (1) and (2). It should be noted that information about the central point and the radius that are of the flight track may alternatively be calculated by the high-altitude RRU and sent to the ground BBU.

The ground BBU may calculate the distance L between the ground BBU and the central point of the flight track according to the foregoing formula (3), where $(x_B, y_B, z_B)$ is the location of the ground BBU.

The beam direction is determined based on a horizontal azimuth φ and a vertical azimuth φ of a beam. The ground BBU may calculate the horizontal azimuth φ and the vertical azimuth φ of the beam according to the foregoing formula (4).

Figure 4A:
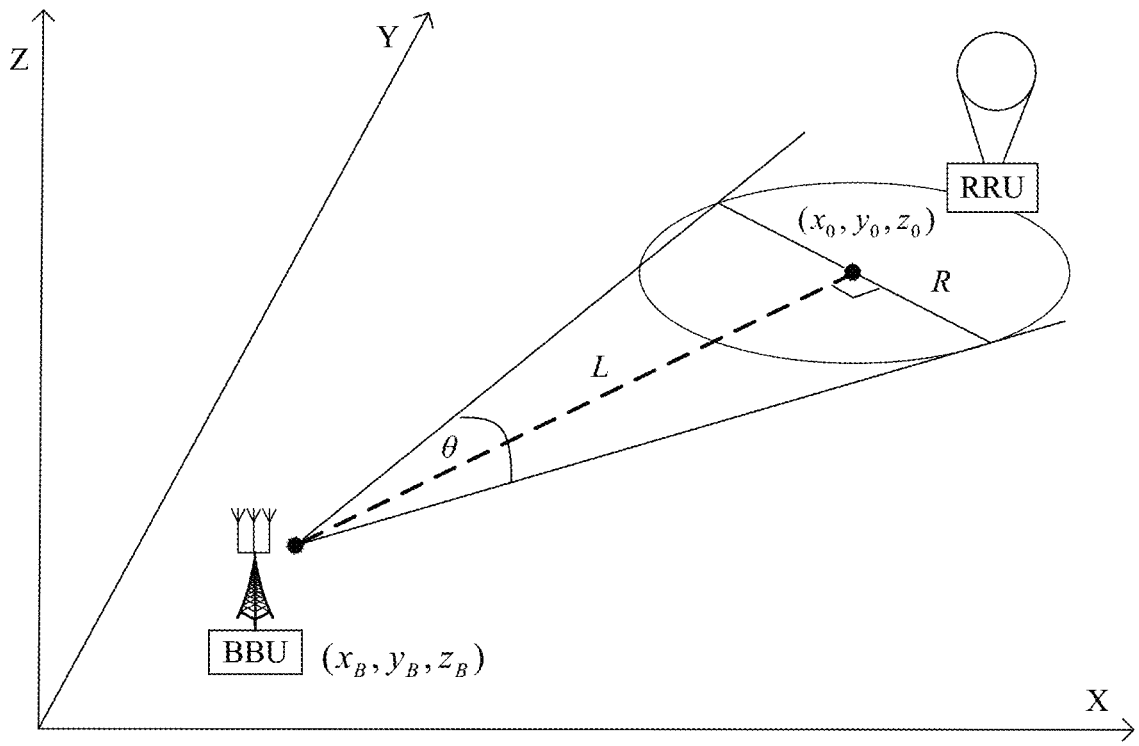
FIG. 4A is a schematic diagram of another method for obtaining a horizontal lobe angle of a beam according to an embodiment of the present invention.

In this embodiment of the present invention, after determining the beam direction, the ground BBU calculates the beam width. The beam width is determined based on a horizontal lobe angle θ and a vertical lobe angle ψ. As shown in FIG. 4A, a method for obtaining a horizontal lobe angle of a beam may be as follows.

The ground BBU may calculate the horizontal lobe angle θ of the beam according to the foregoing formula (5).

Figure 4B:
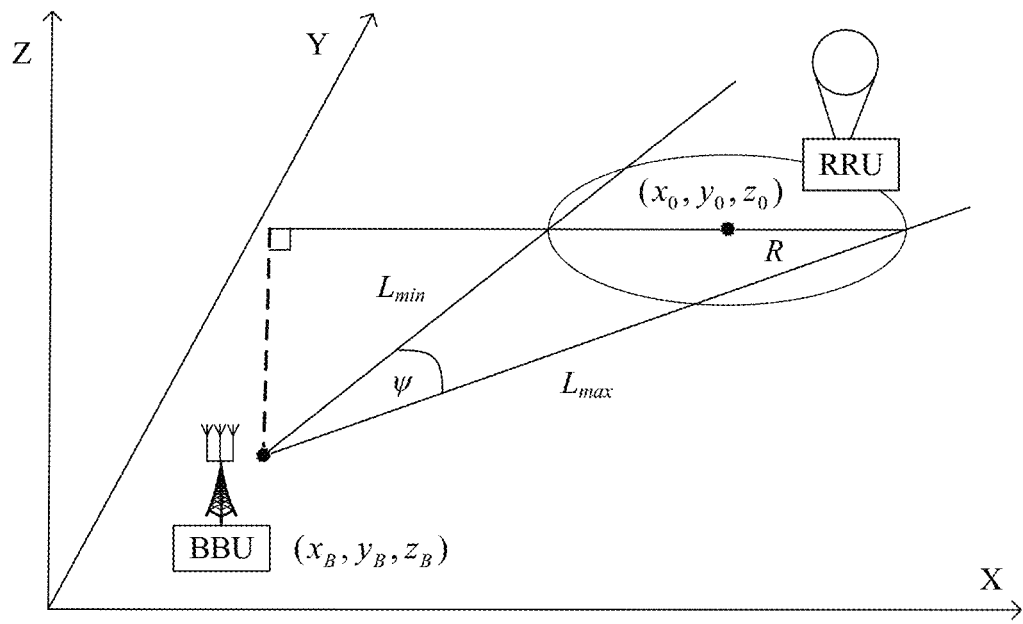
FIG. 4B is a schematic diagram of another method for obtaining a vertical lobe angle of a beam according to an embodiment of the present invention.

As shown in FIG. 4B, a method for obtaining a vertical lobe angle of a beam may be: The ground BBU may calculate the vertical lobe angle ψ of the beam according to the foregoing formula (6).

According to the foregoing methods for calculating the beam direction and the beam width, the ground BBU can control a signal beam to the high-altitude RRU.

In a second case, when the initial beam coverage radius is less than or equal to the flight track radius, the beam from the ground BBU to the high-altitude RRU covers a specific range around the high-altitude RRU, but cannot cover the flight track of the high-altitude RRU.

The initial beam control information includes the initial beam coverage radius information and the location information of the high-altitude RRU. The ground BBU performs beam control based on the location information of the high-altitude RRU and the initial beam coverage radius information. As shown in FIG. 3D, a method for obtaining the beam direction may be as follows.

At the specified moment $t_1$, the location of the high-altitude RRU is $(x_{t_1}, y_{t_1}, z_{t_1})$ and the location information is sent to the ground BBU. The ground BBU periodically receives and stores the location information of the high-altitude RRU. It should be noted that upon obtaining the location information, the high-altitude RRU sends the location information to the ground BBU. An interval between a moment at which the ground BBU receives the location information and a moment at which the high-altitude RRU obtains the location information is very small, and a moving distance of the high-altitude RRU within the interval is also very small, and it may be approximately considered that there is no movement. For example, a value of the distance between the high-altitude RRU and the ground BBU is 100 km, a value of a signal transmission delay is 0.33 ms, a value of a signal processing delay may be 1 ms, and a value of the interval is 1.33 ms. A value of a speed of the high-altitude RRU may be 20 m/s, and a value of the moving distance within the interval is 26.6 mm, and it may be approximately considered that there is no movement.

The ground BBU may calculate the distance $L_{t_1}$ between the ground BBU and the high-altitude RRU according to the foregoing formula (7), where $(x_B, y_B, z_B)$ is the location of the ground BBU.

The beam direction is determined based on a horizontal azimuth φ and a vertical azimuth φ of a beam. The ground BBU may calculate the horizontal azimuth φ and the vertical azimuth φ of the beam according to the foregoing formula (8).

Figure 4C:
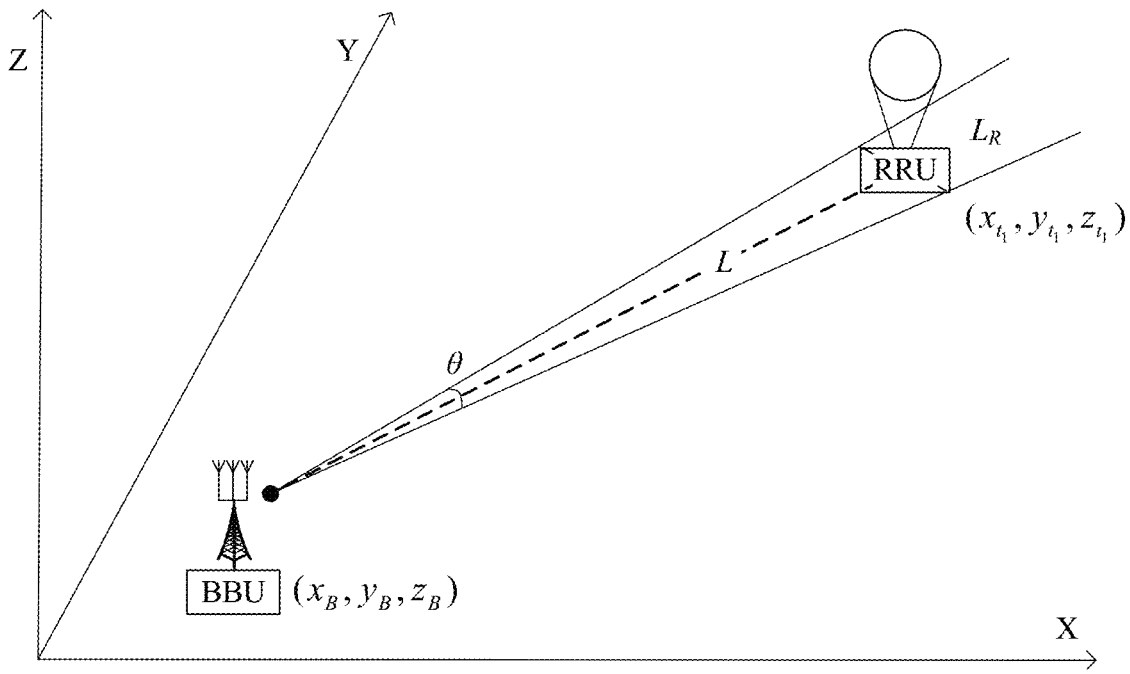
FIG. 4C is a schematic diagram of another method for obtaining a horizontal lobe angle of a beam according to an embodiment of the present invention.

In this embodiment of the present invention, after determining the beam direction, the ground BBU calculates the beam width. The beam width is determined based on a horizontal lobe angle θ and a vertical lobe angle ψ. As shown in FIG. 4C, a method for obtaining a horizontal lobe angle of a beam may be as follows.

The ground BBU may calculate the horizontal lobe angle θ of the beam according to the foregoing formula (9).

It should be noted that the high-altitude RRU device includes an antenna system, and $L_2$ may be a size of the high-altitude RRU, or may be a size of the antenna system, or may be a value greater than the size of the high-altitude RRU.

Figure 4D:
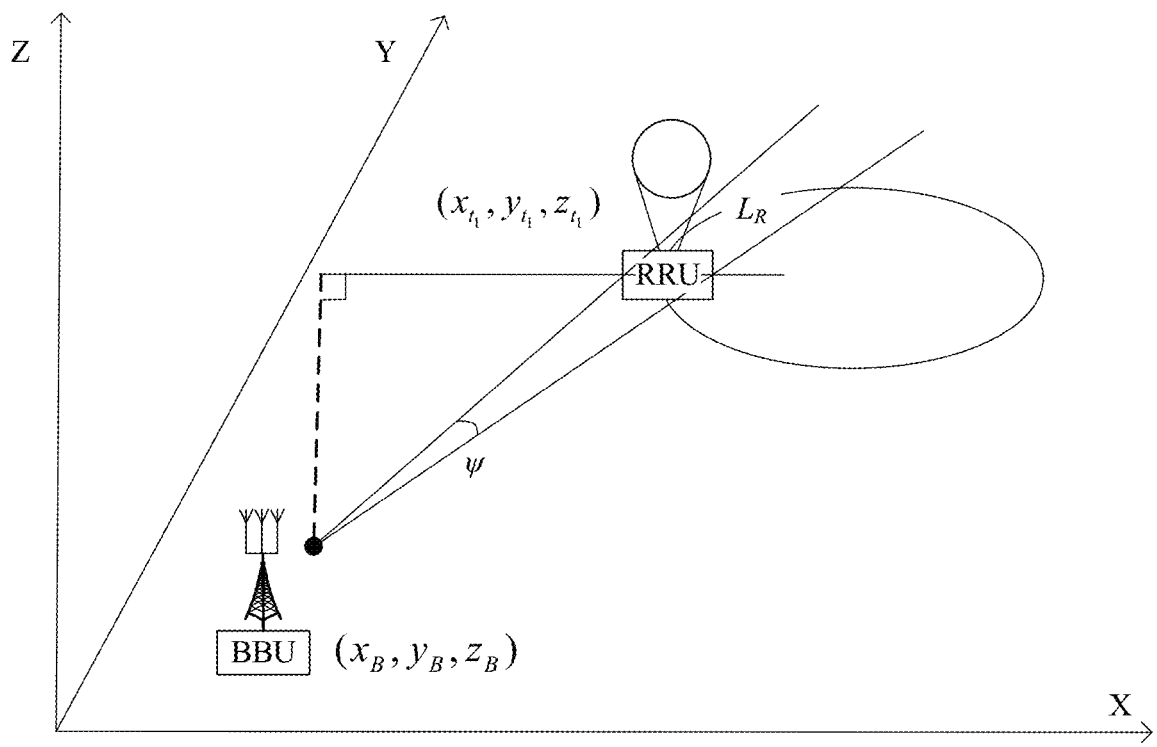
FIG. 4D is a schematic diagram of another method for obtaining a vertical lobe angle of a beam according to an embodiment of the present invention.

As shown in FIG. 4D, a method for obtaining a vertical lobe angle of a beam may be as follows.

It should be noted that a value of the vertical lobe angle ψ of the beam varies according to different locations of the high-altitude RRU.

At the moment $t_1$, the ground BBU may calculate the vertical lobe angle ψ of the beam according to the foregoing formula (10).

204. The high-altitude RRU periodically calculates a wind speed variation.

In a flight phase of the high-altitude RRU, the high-altitude RRU periodically obtains a wind speed $\vec{V}_w'$, and may calculate the wind speed variation $\vec{\Delta}$ according to the following formula 13.

$$\vec{\Delta} = \vec{V}_w' - \vec{V}_w \qquad (13)$$

The wind speed variation is a vector including a rate and a direction.

A change in the wind speed is ultimately reflected in a change in the moving rate of the high-altitude RRU. A smaller difference indicates a more stable wind speed and a more stable flight of the high-altitude RRU.

When the wind speed is stable, the ground BBU may use a beam with a relatively small width to cover the high-altitude RRU, to obtain a relatively high antenna gain. Similarly, the high-altitude RRU may perform the same operation. If a link budget is fixed, the high-altitude RRU may use relatively low transmit power to perform wireless communication with the ground BBU, to reduce power consumption of the high-altitude RRU.

When the wind speed is unstable, to prevent the high-altitude RRU from flying out of the beam coverage area, the beam width may be adjusted based on the wind speed information. The ground BBU may use a beam with a relatively great width to cover the high-altitude RRU, to ensure that the high-altitude RRU does not fly out of the beam coverage area, thereby obtaining a relatively low antenna gain.

The high-altitude RRU may obtain a wind speed change value $|\vec{\Delta}|$ based on the wind speed variation, and compare the wind speed change value with a local preset wind speed change threshold such as 1 m/s.

If the wind speed change value is less than the wind speed change threshold, it indicates that the wind speed is stable, and steps 205 and 206 are periodically performed.

If the wind speed change value is not less than the wind speed change threshold, it indicates that the wind speed is unstable, and performing of steps 207 and 208 is triggered.

205. The high-altitude RRU periodically sends the location information to the ground BBU.

When the wind speed is stable, the beam coverage radius of the ground BBU for the high-altitude RRU is still the initial coverage radius, and does not change. The high-altitude RRU only needs to periodically send the location information to the ground BBU. Specifically, the high-altitude RRU sends the location information to the ground BBU at a specific moment before reaching a boundary of the coverage area. An interval of sending the location information is related to a value of the beam width, and a greater beam width leads to a longer interval of sending the location information.

206. The ground BBU receives the location information of the high-altitude RRU, and performs beam control.

Based on the two cases in step 203, a method for controlling the beam from the ground BBU to the high-altitude RRU may specifically include the following two cases.

In a first case, when the initial beam coverage radius is greater than or equal to the flight track radius, the beam from the ground BBU to the high-altitude RRU covers the flight track of the high-altitude RRU.

The beam direction and the beam width are the same as those calculated in the first case in step 203, and do not change. The ground BBU does not need to perform calculation again.

In a second case, when the initial beam coverage radius is less than or equal to the flight track radius, the beam from the ground BBU to the high-altitude RRU covers a specific range around the high-altitude RRU, but cannot cover the flight track of the high-altitude RRU.

The ground BBU performs beam control based on the location information of the high-altitude RRU and the initial beam coverage radius information. A specific beam direction calculation method and a specific beam width calculation method are the same as the beam direction calculation method and the beam width calculation method in the second case in step 203. Details are not described herein again.

207. The high-altitude RRU calculates new beam coverage radius information, and sends beam control information to the ground BBU.

When the wind speed is unstable, to prevent a free space link between the high-altitude RRU and the ground BBU from being interrupted because the high-altitude RRU flies out of the beam coverage area, if the wind speed change value $\overset{\shortmid}{\Delta}$ is greater than the preset wind speed change threshold, the high-altitude RRU may calculate a new moving rate v' relative to the ground according to the following formula 14.

$$v' = |\vec{V'}| = |\vec{V} + \vec{\Delta}| \quad (14)$$

$\vec{V}$ represents the wind speed variation, and $\vec{V}$ represents a current moving speed of the high-altitude RRU relative to the ground. Specifically, the high-altitude RRU calculates the moving speed according to coordinate values and a time difference of two locations.

Based on the two cases in step 202, a method used by the high-altitude RRU to calculate a new beam coverage radius may specifically include the following two cases.

In a first case, when the initial beam coverage radius is greater than or equal to the flight track radius, the beam from the ground BBU to the high-altitude RRU covers the flight track of the high-altitude RRU.

In an embodiment of the present invention, the high-altitude RRU may calculate a beam coverage radius change value Δr according to the following formula 15.

$$\Delta r = T * v'. \quad (15)$$

The high-altitude RRU sends beam coverage radius change value information to the ground BBU. The beam coverage radius change value information is used to adjust the width of the beam from the ground BBU to the high-altitude RRU.

In another embodiment of the present invention, the high-altitude RRU calculates a beam coverage radius change value according to the foregoing formula (15). The high-altitude RRU may calculate a new beam coverage radius r' according to the following formula 16.

$$R' = \Delta r + r \quad (16)$$

The high-altitude RRU sends new beam coverage radius information to the ground BBU. The new beam coverage radius information is used to adjust the width of the beam from the ground BBU to the high-altitude RRU.

In still another embodiment of the present invention, the high-altitude RRU and the ground BBU maintain a same table of beam coverage radiuses corresponding to different wind speed change values $|\overset{\shortmid}{\Delta}|$. For example, specific content is shown in Table 1.

TABLE 1

| Sequence Number | Wind Speed Change Value | Beam Coverage Radius |
|---|---|---|
| 1 | $0 < \overset{\shortmid}{\Delta} <= a1$ | R1 |
| 2 | $a1 < \overset{\shortmid}{\Delta} < a2$ | R2 |
| ... | ... | ... |

After calculating the wind speed change value $|\overset{\shortmid}{\Delta}|$, the high-altitude RRU may find a sequence number of a corresponding beam coverage radius in the table, and send sequence number information to the ground BBU. After receiving the sequence number information, the ground BBU performs table lookup, to find the corresponding beam coverage radius.

In a second case, when the initial beam coverage radius is less than or equal to the flight track radius, the beam from the ground BBU to the high-altitude RRU covers a specific range around the high-altitude RRU, but cannot cover the flight track of the high-altitude RRU.

In an embodiment of the present invention, the high-altitude RRU may calculate a new beam coverage radius r' according to the following formula 17.

$$r' = T * v' \quad (17)$$

The high-altitude RRU sends new beam coverage radius information to the ground BBU. The new beam coverage radius information is used to adjust the width of the beam from the ground BBU to the high-altitude RRU.

Optionally, the high-altitude RRU may send the new beam coverage radius information and new location information. The new beam coverage radius information and the new location information are used to adjust the direction and the width of the beam from the ground BBU to the high-altitude RRU.

In another embodiment of the present invention, the high-altitude RRU calculates a new beam coverage radius r' according to the foregoing formula (17). The high-altitude RRU may calculate a beam coverage radius change value Δr according to the following formula 18.

$$\Delta r = r' - r \quad (18)$$

The high-altitude RRU sends beam coverage radius change value information to the ground BBU. The beam coverage radius change value information is used to adjust the width of the beam from the ground BBU to the high-altitude RRU.

Optionally, the high-altitude RRU may send the beam coverage radius change value information and new location information. The beam coverage radius change value information and the new location information are used to adjust the direction and the width of the beam from the ground BBU to the high-altitude RRU.

In still another embodiment of the present invention, the high-altitude RRU and the ground BBU maintain a same table of beam coverage radiuses corresponding to different wind speed change values $|\overset{\star}{\Delta}|$. For example, specific content is shown in the foregoing Table 1. After calculating the wind speed change value $|\overset{\star}{\Delta}|$, the high-altitude RRU may find a sequence number of a corresponding beam coverage radius in the table, and send sequence number information to the ground BBU. After receiving the sequence number information, the ground BBU performs table lookup, to find the corresponding beam coverage radius.

The high-altitude RRU sends the beam control information to the ground BBU. Specifically, the beam control information includes one of the new beam coverage radius, the beam coverage radius change value, or the sequence number information.

In addition, the high-altitude RRU needs to perform flight control to enable the high-altitude RRU to return to an initial flight track.

208. The ground BBU receives the beam control information, and performs beam control.

The beam control information includes one of the new beam coverage radius, the beam coverage radius change value, or the sequence number information. Optionally, the beam control information may further include the location information of the high-altitude RRU.

Based on the two cases in step 203, a method for controlling the beam from the ground BBU to the high-altitude RRU may specifically include the following two cases.

In a first case, when the initial beam coverage radius is greater than or equal to the flight track radius, the beam from the ground BBU to the high-altitude RRU covers the flight track of the high-altitude RRU.

In an embodiment of the present invention, the beam control information is the beam coverage radius change value. Specifically, as shown in the foregoing formula (16), the ground BBU calculates new beam coverage radius information according to the beam coverage radius change value and the initial beam coverage radius information. The ground BBU calculates a new beam width according to a new beam coverage radius. A specific beam width calculation method is the same as the beam width calculation method in the first case in step 203. Details are not described herein again.

In another embodiment of the present invention, the beam control information is the new beam coverage radius. The ground BBU calculates a new beam width according to the new beam coverage radius. A specific beam width calculation method is the same as the beam width calculation method in the second case in step 203. Details are not described herein again.

In still another embodiment of the present invention, the beam control information is the sequence number information. The ground BBU searches the foregoing Table 1 for corresponding beam coverage radius information according to the sequence number information. The ground BBU calculates a new beam width according to a new beam coverage radius. A specific beam width calculation method is the same as the beam width calculation method in the first case in step 203. Details are not described herein again.

In a second case, when the initial beam coverage radius is less than or equal to the flight track radius, the beam from the ground BBU to the high-altitude RRU covers a specific range around the high-altitude RRU, but cannot cover the flight track of the high-altitude RRU.

In an embodiment of the present invention, the beam control information is the new beam coverage radius. The ground BBU calculates a new beam width according to the new beam coverage radius. A specific beam width calculation method is the same as the beam width calculation method in the second case in step 203. Details are not described herein again.

Optionally, the ground BBU adjusts the direction and the width of the beam from the ground BBU to the high-altitude RRU based on the new beam coverage radius and the location information of the high-altitude RRU. A specific beam direction calculation method and a specific beam width calculation method are the same as the beam direction calculation method and the beam width calculation method in the second case in step 203. Details are not described herein again.

In another embodiment of the present invention, the beam control information is the beam coverage radius change value. Specifically, as shown in the foregoing formula (16), the ground BBU calculates new beam coverage radius information according to the beam coverage radius change value and the initial beam coverage radius information. The ground BBU calculates a new beam width according to a new beam coverage radius. A specific beam width calculation method is the same as the beam width calculation method in the second case in step 203. Details are not described herein again.

Optionally, the ground BBU adjusts the direction and the width of the beam from the ground BBU to the high-altitude RRU based on the new beam coverage radius and the location information of the high-altitude RRU. A specific beam direction calculation method and a specific beam width calculation method are the same as the beam direction calculation method and the beam width calculation method in the second case in step 203. Details are not described herein again.

In still another embodiment of the present invention, the beam control information is the sequence number information. The ground BBU searches the foregoing Table 1 for corresponding beam coverage radius information according to the sequence number information. The ground BBU calculates a new beam width according to a new beam coverage radius. A specific beam width calculation method is the same as the beam width calculation method in the second case in step 203. Details are not described herein again.

Optionally, the ground BBU adjusts the direction and the width of the beam from the ground BBU to the high-altitude RRU based on the new beam coverage radius and the location information of the high-altitude RRU. A specific beam direction calculation method and a specific beam width calculation method are the same as the beam direction calculation method and the beam width calculation method in the second case in step 203. Details are not described herein again.

Figure 5:
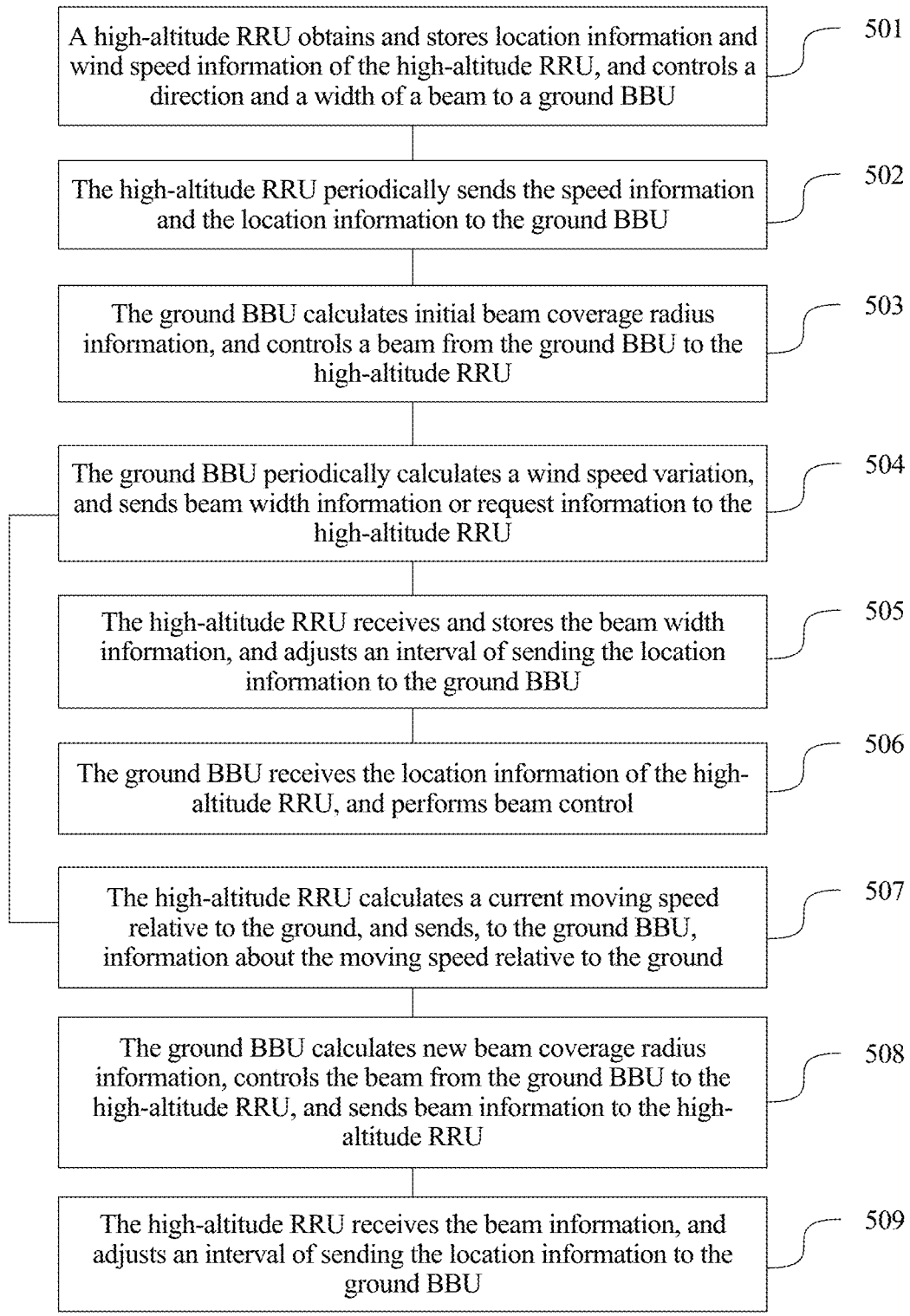
FIG. 5 is a flowchart of another communication method according to an embodiment of the present invention.

FIG. 5 is a flowchart of another communication control method according to an embodiment of the present invention. Beam information is calculated by a ground BBU. Referring to FIG. 5, the method includes the following operations.

501. A high-altitude RRU obtains and stores location information and wind speed information of the high-altitude RRU, and controls a direction and a width of a beam to the ground BBU.

A specific beam direction calculation method and a specific beam width calculation method are the same as the methods in step 201. Details are not described herein again.

502. The high-altitude RRU periodically sends the wind speed information and the location information to the ground BBU.

The wind speed information includes an average wind speed $\overset{\shortmid}{V}_w$, a current wind speed $\overset{\shortmid}{v}_w$, and an average rate v relative to the ground.

The location information may be current location information of the high-altitude RRU. Alternatively, the location information may be a flight track radius and a flight track central location of the high-altitude RRU.

503. The ground BBU calculates initial beam coverage radius information, and controls a beam from the ground BBU to the high-altitude RRU.

A width of the beam from the ground BBU to the high-altitude RRU and a method used by the ground BBU to calculate the initial beam coverage radius vary according to different expected beam direction control frequencies. The method may specifically include the following two cases.

In a first case, when the initial beam coverage radius is greater than or equal to the flight track radius, the ground BBU expects that a coverage area of the beam from the ground BBU to the high-altitude RRU is relatively large and can cover a flight track of the high-altitude RRU. The high-altitude RRU sends the location information to the ground BBU at a relatively low frequency, and the high-altitude RRU sends the location information to the ground BBU only in a specific condition. The initial beam coverage radius r of the beam from the ground BBU to the high-altitude RRU is equal to the flight track radius R of the high-altitude RRU.

The ground BBU determines a direction and a width of the beam from the ground BBU to the high-altitude RRU based on the initial beam coverage radius and flight track central location information of the high-altitude RRU. A specific beam direction calculation method and a specific beam width calculation method are the same as the beam direction calculation method and the beam width calculation method in the first case in step 203. Details are not described herein again.

In a second case, when the initial beam coverage radius is less than or equal to the flight track radius, the ground BBU expects that a coverage area of the beam from the ground BBU to the high-altitude RRU is relatively small and cannot cover the flight track of the high-altitude RRU. The high-altitude RRU sends the location information to the ground BBU at a relatively high frequency. The ground BBU may calculate the initial beam coverage radius r of the beam from the ground BBU to the high-altitude RRU according to the foregoing formula (12).

The ground BBU determines a direction and a width of the beam from the ground BBU to the high-altitude RRU based on the initial beam coverage radius and the location information of the high-altitude RRU. A specific beam direction calculation method and a specific beam width calculation method are the same as the beam direction calculation method and the beam width calculation method in the second case in step 203. Details are not described herein again.

504. The ground BBU periodically calculates a wind speed variation, and sends beam width information or request information to the high-altitude RRU.

The ground BBU periodically obtains a wind speed $\overset{\shortmid}{v}_w$, and may calculate the wind speed variation $\overset{\shortmid}{\Delta}$ according to the foregoing formula (13). The ground BBU may obtain a wind speed change value $|\overset{\shortmid}{\Delta}|$ based on the wind speed variation, and compare the wind speed change value with a local preset wind speed change threshold. If the wind speed change value is less than the wind speed change threshold, it indicates that the wind speed is stable, the ground BBU sends the beam width information to the high-altitude RRU, and steps 505 and 506 are periodically performed. It should be noted that the ground BBU may further send the beam coverage radius information to the high-altitude RRU.

If the wind speed change value is not less than the wind speed change threshold, it indicates that the wind speed is unstable. The ground BBU sends a request to the high-altitude RRU. The request is used to obtain a current moving speed of the high-altitude RRU relative to the ground, and performing of steps 507 to 509 is triggered.

505. The high-altitude RRU receives and stores the beam width information, and adjusts an interval of sending the location information to the ground BBU.

The high-altitude RRU determines, according to the beam width information, whether a signal beam from the ground BBU covers a movement range of the high-altitude RRU or covers only the high-altitude RRU. The interval of sending the location information to the ground BBU by the high-altitude RRU varies according to different beam coverage areas.

Figure 6:
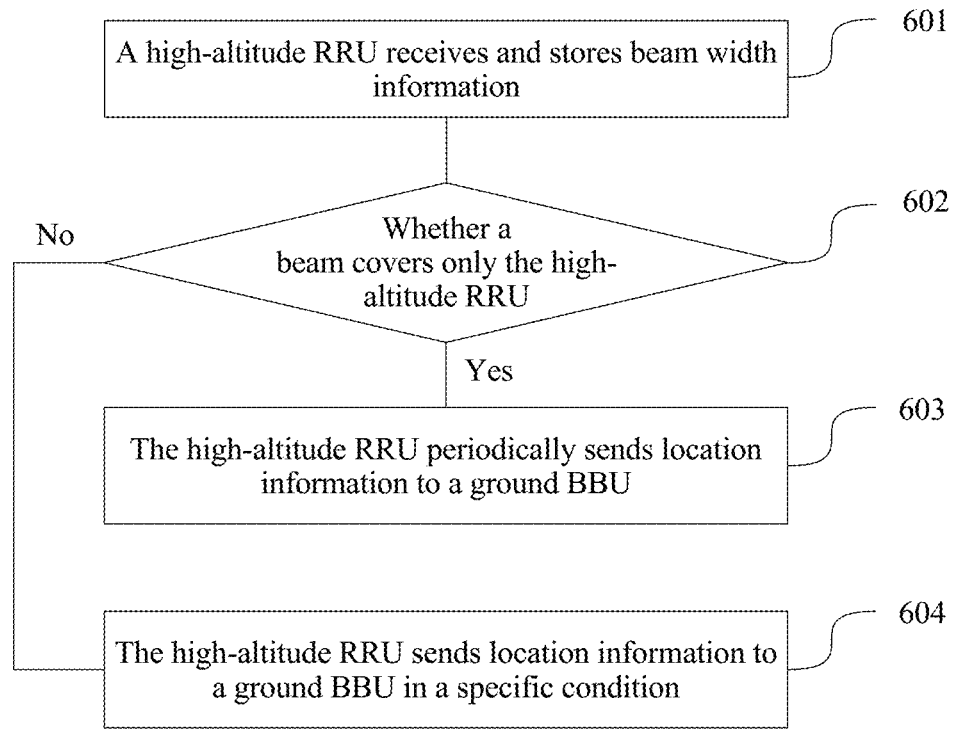
FIG. 6 is a flowchart of a method for determining an interval of sending location information according to an embodiment of the present invention.

FIG. 6 is a process in which the high-altitude RRU determines the interval of sending the location information, including the following steps.

601. The high-altitude RRU receives and stores the beam width information.

Specifically, the beam width information may be an angle value, or may be information indicating whether a beam coverage area of the ground BBU is point coverage.

602. The high-altitude RRU determines, according to the beam width information, whether the beam covers only the high-altitude RRU, and if the beam covers only the high-altitude RRU, 603 is performed, or if the beam covers not only the high-altitude RRU, 604 is performed.

Specifically, if the beam width information is an angle value, the high-altitude RRU calculates the beam coverage area according to the angle value, to determine whether the beam coverage area is point coverage or area coverage. A specific method for calculating the beam coverage area is the same as the method for calculating the beam width in step 202, and details are not described herein.

603. The high-altitude RRU periodically sends the location information to the ground BBU.

Upon periodically obtaining the location information, the high-altitude RRU sends the location information to the ground BBU. The ground BBU receives the location information, calculates the beam direction, and controls the beam to aim at the high-altitude RRU, to obtain a high antenna gain. It should be noted that because the high-altitude RRU periodically sends the location information to the ground BBU, information exchanged between the high-altitude RRU and the ground BBU increases.

604. The high-altitude RRU sends the location information to the ground BBU in a specific condition.

When the beam covers the movement range of the high-altitude RRU, after the high-altitude RRU periodically obtains the location information, the high-altitude RRU sends the location information to the ground RRU only in a specific condition, without periodically sending the location information to the ground BBU. For example, when the radius and the central location of the flight track of the high-altitude RRU change, the high-altitude RRU sends the location information to the ground BBU. The ground BBU may not need to frequently control the beam direction.

506. The ground BBU receives the location information of the high-altitude RRU, and performs beam control.

Based on the two cases in step 203, a method for controlling the beam from the ground BBU to the high-altitude RRU may specifically include the following two cases.

In a first case, when the initial beam coverage radius is greater than or equal to the flight track radius, the beam from the ground BBU to the high-altitude RRU covers the flight track of the high-altitude RRU.

The beam direction and the beam width are the same as those calculated in the first case in step 203, and do not change. The ground BBU does not need to perform calculation again.

In a second case, when the initial beam coverage radius is less than or equal to the flight track radius, the beam from the ground BBU to the high-altitude RRU covers a specific range around the high-altitude RRU, but cannot cover the flight track of the high-altitude RRU.

The ground BBU performs beam control based on the location information of the high-altitude RRU and the initial beam coverage radius information. A specific beam direction calculation method and a specific beam width calculation method are the same as the beam direction calculation method and the beam width calculation method in the second case in step 203. Details are not described herein again.

507. The high-altitude RRU calculates a current moving speed relative to the ground, and sends, to the ground BBU, information about the moving speed relative to the ground.

The moving speed $\overset{1}{V}$ of the high-altitude RRU relative to the ground may be calculated based on GPS positioning. Specifically, the moving speed relative to the ground is calculated according to coordinate values and a time difference of two locations.

508. The ground BBU calculates new beam coverage radius information, controls the beam from the ground BBU to the high-altitude RRU, and sends beam information to the high-altitude RRU.

The ground BBU may calculate a new moving rate v' relative to the ground according to the foregoing formula (13).

Based on the two cases in step 203, a method used by the ground BBU to calculate a new beam coverage radius may specifically include the following two cases.

In a first case, when the initial beam coverage radius is greater than or equal to the flight track radius, the beam from the ground BBU to the high-altitude RRU covers the flight track of the high-altitude RRU.

The ground BBU may calculate a beam coverage radius change value Δr according to the foregoing formula (15). A new beam coverage radius r' is calculated according to the formula (16). The ground BBU calculates a new beam width according to the new beam coverage radius. A specific beam width calculation method is the same as the beam width calculation method in the first case in step 203. Details are not described herein again.

Optionally, the ground BBU adjusts the direction and the width of the beam from the ground BBU to the high-altitude RRU based on the new beam coverage radius and the location information of the high-altitude RRU. A specific beam direction calculation method and a specific beam width calculation method are the same as the beam direction calculation method and the beam width calculation method in the second case in step 203. Details are not described herein again.

In a second case, when the initial beam coverage radius is less than or equal to the flight track radius, the beam from the ground BBU to the high-altitude RRU covers a specific range around the high-altitude RRU, but cannot cover the flight track of the high-altitude RRU.

The ground BBU may calculate a new beam coverage radius r' according to the foregoing formula (17). The ground BBU calculates a new beam width according to the new beam coverage radius. A specific beam width calculation method is the same as the beam width calculation method in the second case in step 203. Details are not described herein again.

Optionally, the ground BBU adjusts the direction and the width of the beam from the ground BBU to the high-altitude RRU based on the new beam coverage radius and the location information of the high-altitude RRU. A specific beam direction calculation method and a specific beam width calculation method are the same as the beam direction calculation method and the beam width calculation method in the second case in step 203. Details are not described herein again.

The ground BBU sends the beam information to the high-altitude RRU. The beam information is used to adjust an interval of sending the location information of the high-altitude RRU. Specifically, the beam information includes the new beam coverage radius, beam coverage radius change value information, and sequence number information. A specific calculation method is the same as that in step 207. Details are not described herein again.

509. The high-altitude RRU receives the beam information, and adjusts an interval of sending the location information to the ground BBU.

The high-altitude RRU receives the beam information, and calculates the new beam coverage radius. A specific calculation method is the same as that in step 207. Details are not described herein again.

The high-altitude RRU adjusts, based on the new beam coverage radius, the interval of sending the location information to the ground BBU.

In addition, the high-altitude RRU needs to perform flight control to enable the high-altitude RRU to return to an initial flight track.

Figure 7A:
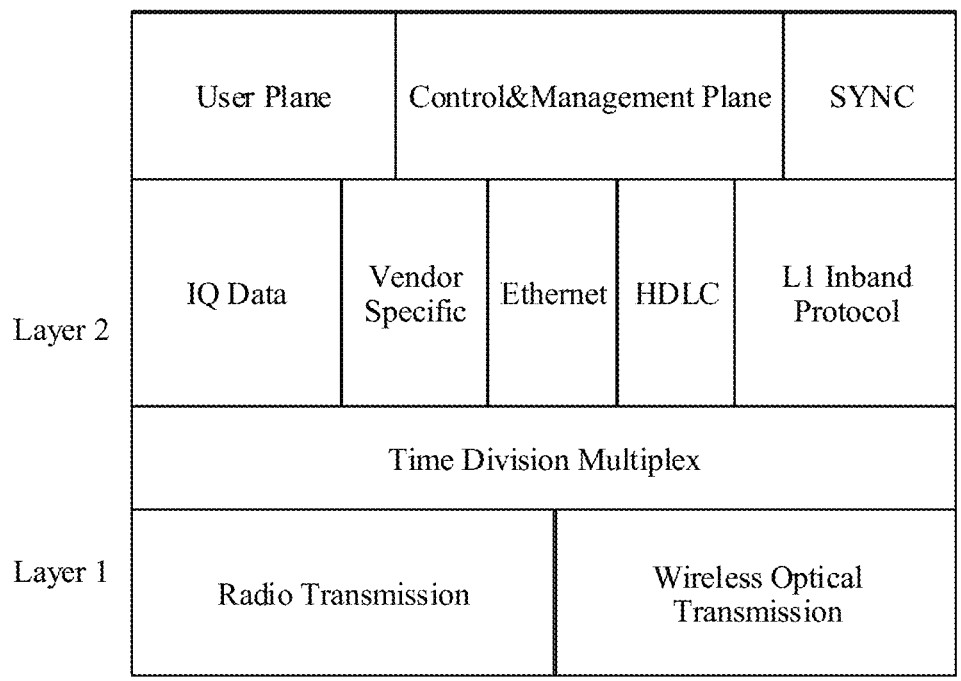
FIG. 7A is a schematic diagram of an architecture of a wireless CPRI protocol according to an embodiment of the present invention.

The ground BBU may include a free space optical link and a microwave link. The high-altitude RRU may include a free space optical link and a microwave link. The high-altitude RRU may communicate with the ground BBU by using a wireless CPRI protocol, or may communicate with another high-altitude RRU by using the wireless CPRI protocol. As shown in FIG. 7A, the wireless CPRI protocol includes two types of physical interfaces: a radio transmission interface and a wireless optical transmission interface. Specifically, the radio transmission interface transmits a microwave signal (for example, a millimeter wave), and the wireless optical transmission interface transmits an optical signal (for example, a laser). A link between a ground BBU and a high-altitude RRU and a link between high-altitude RRUs may be referred to as a wireless fronthaul link.

Some weather factors are detrimental to the wireless fronthaul link, including rain, snow, fog, haze, dust, and the like, because relatively large absorption attenuation is caused when a wavelength of an electromagnetic wave is close to or even smaller than a size of an air particle. For example, because a frequency (approximately 200 THz to 300 THz) of laser communication is much higher than a frequency (30 GHz to 300 GHz) of a millimeter-wave, the frequency of the laser communication is more affected by environmental factors. Laser communication provides a higher transmission rate than a millimeter-wave. To reach a specified transmission rate needs to be achieved, fewer laser communication links are required than millimeter-wave links. For example, a transmission rate of the laser communication may be 10 Gbps, and a transmission rate of the millimeter wave may be 2.5 Gbps. A communication link that has a transmission rate of 10 Gbps can be obtained by using only one laser link, but four millimeter-wave links are required to obtain the communication link. In this case, power consumption of the millimeter-wave link is higher than power consumption of the laser link. In different cases, a laser link or a millimeter-wave link needs to be adaptively selected to implement lower power consumption. Specifically, when quality of the wireless fronthaul link is good, wireless fronthaul is preferentially performed through laser communication. When the quality of the wireless fronthaul link is poor, wireless fronthaul is performed through millimeter-wave communication. An initial state of the wireless fronthaul link may be a radio transmission interface or a wireless optical transmission interface.

Figure 7B:
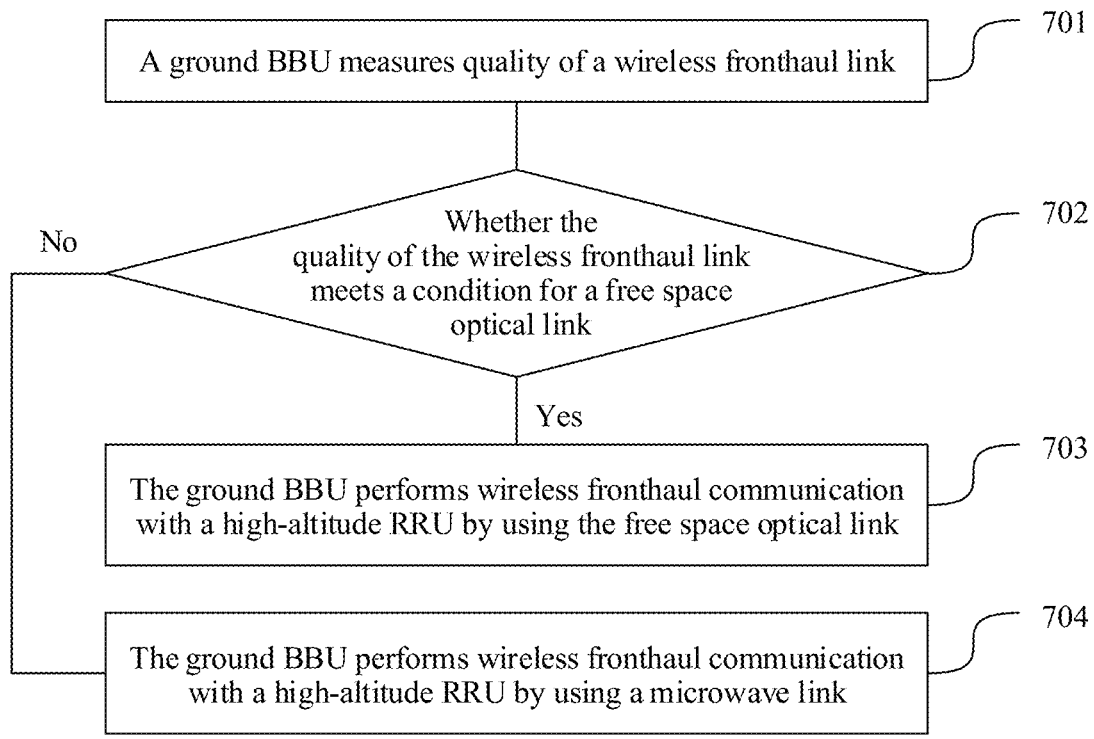
FIG. 7B is a flowchart of switching on a wireless fronthaul link according to an embodiment of the present invention.

FIG. 7B is a process of adaptive link switching, including the following operations.

701. A ground BBU measures quality of a wireless fronthaul link.

Specifically, the ground BBU may measure the quality $Q_f$ of the wireless fronthaul link according to a bit error rate of received data. For example, $Q_f$ may be quantized to a specific value from 0 to 255. A larger value indicates better quality of the link, and a smaller value indicates poorer quality of the link. The quality of the wireless fronthaul link may alternatively be measured by using another method, and this is not specifically limited in this embodiment of the present invention.

702. The ground BBU determines whether to use a free space optical link according to the quality of the wireless fronthaul link, and if a determining result is to use the free space optical link, 703 is performed, or if a determining result is not to use the free space optical link, 704 is performed.

The ground BBU compares the quality $Q_f$ of the wireless fronthaul link with a threshold T. If the quality $Q_f$ of the wireless fronthaul link is greater than the threshold T, it indicates that the quality of the wireless fronthaul link can meet a condition for the free space optical link, and the free space optical link is used to perform wireless fronthaul communication. If the quality $Q_f$ of the wireless fronthaul link is less than or equal to the threshold T, it indicates that the quality of the wireless fronthaul link does not meet the condition for the free space optical link, and a microwave link is used to perform the wireless fronthaul communication. It should be noted that the threshold may be preconfigured by the ground BBU, or may be reconfigured according to a condition.

703. The ground BBU performs wireless fronthaul communication with a high-altitude RRU by using the free space optical link.

The ground BBU sends switching control information to the high-altitude RRU. The high-altitude RRU receives the switching control information, performs wireless fronthaul communication by using the free space optical link according to an indication in the switching control information, and sends confirmation information to the ground BBU.

704. The ground BBU performs wireless fronthaul communication with a high-altitude RRU by using a microwave link.

The ground BBU sends switching control information to the high-altitude RRU. The high-altitude RRU receives the switching control information, performs wireless fronthaul communication by using the microwave link according to an indication in the switching control information, and sends confirmation information to the ground BBU.

It should be noted that the high-altitude RRU may also measure quality of a wireless fronthaul link, to perform adaptive switching on a link between high-altitude RRUs.

In another embodiment of the present invention, the CPRI protocol includes a plurality of control words for synchronization and control management of a fronthaul link. Definitions of the control words are shown in Table 1A.

TABLE 1A

| Subchannel Number Ns | Purpose of Subchannel | Xs = 0 | Xs = 1 | Xs = 2 | Xs = 3 |
|---|---|---|---|---|---|
| 0 | sync&timing | sync byte | HFN | BFN-low | BFN-high |
| 1 | slow C&M | slow C&M | slow C&M | slow C&M | slow C&M |
| 2 | L1 inband prot. | version | startup | L1-reset-LOS . . . | pointer p |
| 3 | reserved | reserved | reserved | reserved | reserved |
| 4 | Ctrl_AxC low Byte | Ctrl_AxC | Ctrl_AxC | Ctrl_AxC | Ctrl_AxC |
| 5 | Ctrl_AxC low Byte | Ctrl_AxC | Ctrl_AxC | Ctrl_AxC | Ctrl_AxC |
| 6 | Ctrl_AxC high Byte | Ctrl_AxC | Ctrl_AxC | Ctrl_AxC | Ctrl_AxC |
| 7 | Ctrl_AxC high Byte | Ctrl_AxC | Ctrl_AxC | Ctrl_AxC | Ctrl_AxC |
| 8 | reserved | reserved | reserved | reserved | reserved |
| . . . | . . . | . . . | . . . | . . . | . . . |
| 15 | reserved | reserved | reserved | reserved | reserved |
| 16 | vendor specific | vendor specific | vendor specific | vendor specific | vendor specific |
| . . . | . . . | . . . | . . . | . . . | . . . |

TABLE 1A-continued

| Subchannel Number Ns | Purpose of Subchannel | Xs = 0 | Xs = 1 | Xs = 2 | Xs = 3 |
| --- | --- | --- | --- | --- | --- |
| p-1 pointer: p | vendor specific fast C&M | vendor specific fast C&M | vendor specific fast C&M | vendor specific fast C&M | vendor specific fast C&M |
| ... | ... | ... | ... | ... | ... |
| 63 | | fast C&M | fast C&M | fast C&M | fast C&M |

In the table, vendor specific may be defined by manufacturers.

Content of the switching control information includes transmission by using a radio transmission interface or transmission by using an optical transmission interface. For example, a configuration of the switching control information may be shown in Table 2.

TABLE 2

| Number (Z.X.Y) | Name | Bit Width | Value Range | Default Value | Description |
| --- | --- | --- | --- | --- | --- |
| Z.16.0 | Switch | Bit 0 | "0" to "1" | "0" | "0": transmission by using a radio transmission interface; "1": transmission by using an optical transmission interface. |

Z is a quantity of superframes, X is a quantity of basic frames in a superframe, Y is a quantity of bytes in each word, and content of other bits (for example, Bit 7 to Bit 1) is reserved.

The ground BBU sends switch information to the high-altitude RRU. If a value is "0", it indicates that wireless fronthaul communication is performed by using a microwave link. If the value is "1", it indicates that wireless fronthaul communication is performed by using a free space optical link. After receiving the switch information, the high-altitude RRU uses a corresponding link to perform wireless fronthaul communication, and sends same switch information to the ground BBU for confirmation.

Figure 8:
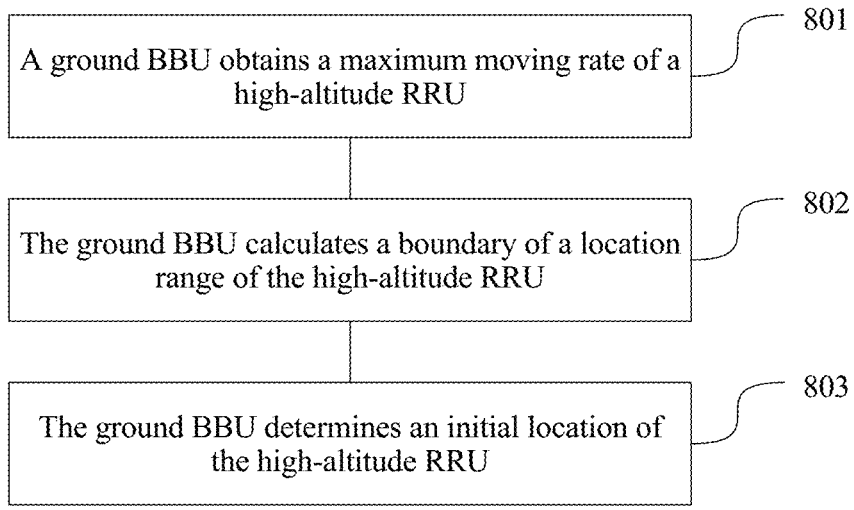
FIG. 8 is a flowchart of a method for determining a boundary of a location range of a high-altitude RRU according to an embodiment of the present invention.

FIG. 8 is a flowchart of a method for determining a boundary of a location range of a high-altitude RRU according to an embodiment of the present invention. The high-altitude RRU continuously moves in the stratosphere, causing a Doppler frequency shift. This affects quality of a wireless fronthaul link. A location of the high-altitude RRU needs to be constrained, to control the high-altitude RRU to move within the boundary of the location range, to prevent quality of wireless fronthaul communication from being affected. Referring to FIG. 8, the method includes the following operations.

801. A ground BBU obtains a maximum moving rate of the high-altitude RRU.

The high-altitude RRU periodically obtains a location of the high-altitude RRU, and sends location information to the ground BBU.

The ground BBU receives the location information. At a moment $t_4$, the location of the high-altitude RRU is $(x_{t_4}, y_{t_4}, z_{t_4})$. At a moment $t_5$, the location of the high-altitude RRU is $(x_{t_5}, y_{t_5}, z_{t_5})$. An average rate in a time period between $t_4$ and $t_5$ is calculated according to the foregoing formula (11).

In one or more flight cycles, the high-altitude RRU calculates a plurality of speed values $v=[v_1 \ v_2 \ L \ v_n]$, to obtain a maximum moving rate value $v_{max}$. It should be noted that the high-altitude RRU may alternatively calculate a maximum moving rate value, and send the maximum moving rate value to the ground BBU.

802. The ground BBU calculates the boundary of the location range of the high-altitude RRU.

For example, as shown in FIG. 8, a maximum frequency offset allowed for the wireless fronthaul link is $\Delta f_{max}$, a location of the ground BBU is $(x_B, y_B, z_B)$, and an initial location of the high-altitude RRU is $(x_R, y_R, z_R)$. The boundary of the location range of the high-altitude RRU may be calculated according to the following formula 15.

$$\cos\theta = \frac{\sqrt[2]{L^2 - H^2}}{L} < \Delta f_{max} \cdot \frac{\lambda}{v_{max}} \quad (15)$$

$v_{max}$ is the maximum moving rate value, $\lambda$ is a wavelength, $\theta$ is an angle between a moving direction and an incident wave direction, L is a value of a distance between the ground BBU and the high-altitude RRU, and H is a difference between a vertical elevation of the ground BBU and a vertical elevation of the high-altitude RRU.

803. The ground BBU determines an initial location of the high-altitude RRU.

The ground BBU may determine the initial location of the high-altitude RRU according to the boundary of the location range of the high-altitude RRU, and send location information to the high-altitude RRU. After receiving the location information, the high-altitude RRU may move to a specified location according to the location information.

At a same altitude, a larger distance between the high-altitude RRU and the ground BBU indicates a larger Doppler frequency shift.

When a center of the flight track of the high-altitude RRU is right above the ground BBU (or the high-altitude RRU is right above the ground BBU), the Doppler frequency shift is zero. In this case, the location of the high-altitude RRU is optimal.

In addition, the ground BBU may re-perform network planning as required, to update the initial location of the high-altitude RRU.

Figure 9:
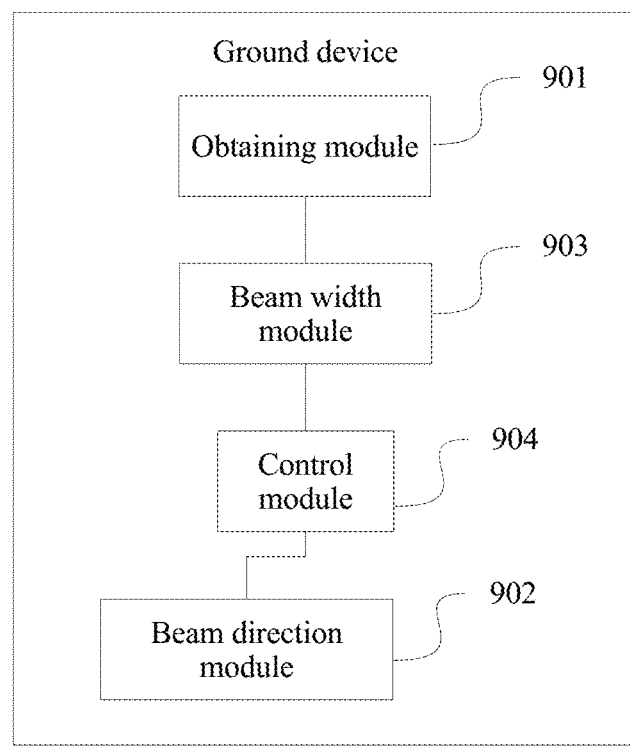
FIG. 9 is an block diagram of a ground device according to an embodiment of the present invention.

FIG. 9 is an block diagram of a ground device according to an embodiment of the present invention. Referring to FIG. 9, the ground device is applied to a hierarchical network that includes a ground network and at least one aerial network, the ground device is configured to control air-ground communication, and the ground device includes:

an obtaining module 901, configured to obtain a beam coverage radius for a high-altitude device, where the beam coverage radius is calculated according to a current moving speed of the high-altitude device relative to the ground or a flight track radius of the high-altitude device, the flight track radius of the high-altitude device is calculated according to location information of the high-altitude device, the ground device is located in the ground network, the high-altitude device is located in the aerial network, and a beam of the high-altitude device covers the ground device;

a beam direction module 902, configured to determine a direction of a beam from the ground device to the high-altitude device according to location information of the ground device;

a beam width module 903, configured to determine a width of the beam from the ground device to the high-altitude device according to the beam coverage radius obtained by the obtaining module 901; and a control module 904, configured to control the beam from the ground device to the high-altitude device according to the beam direction determined by the beam direction module 902 and the beam width determined by the beam width module 903.

Optionally, the beam direction module 902 may include:

a track center coordinates calculation unit 9021, configured to calculate coordinates of a central location of a moving track of the high-altitude device according to the location information of the high-altitude device; and a direction calculation unit 9022, configured to calculate the beam direction according to the coordinates of the central location of the moving track that are calculated by the track center coordinates calculation unit 9021 and the location information of the ground device.

Optionally, the beam width module 903 includes:

a track center coordinates calculation unit 9031, configured to calculate coordinates of a central location of a moving track of the high-altitude device according to the location information of the high-altitude device; and a beam width calculation unit 9032, configured to calculate the beam width according to the coordinates of the central location of the moving track, the location information of the ground device, and the beam coverage radius.

In another possible implementation, the beam direction module 902 may include:

a distance calculation module 90201, configured to calculate a distance between the ground device and the high-altitude device according to the location information of the ground device and the location information of the high-altitude device; and a beam direction calculation module 90202, configured to calculate the beam direction according to the distance that is between the ground device and the high-altitude device and that is calculated by the distance calculation module, the location information of the high-altitude device, and the location information of the ground device.

In another possible implementation, the beam width module 903 includes:

a radius calculation module 90301, configured to calculate a radius of a moving track according to the location information of the high-altitude device;

a distance calculation module 90302, configured to calculate a distance between the ground device and the high-altitude device according to the location information of the ground device and the location information of the high-altitude device; and a beam width information calculation module 90303, configured to calculate beam width information according to the distance that is between the ground device and the high-altitude device and that is calculated by the distance calculation module, the beam coverage radius, the location information of the high-altitude device, and the location information of the ground device.

Optionally, the ground device is a BBU, a base station, or a cloud baseband unit, the cloud baseband unit includes a plurality of BBUs, and the high-altitude device is an RRU, a repeater, or an antenna.

In the technical solution provided in this embodiment of the present invention, the high-altitude device may determine, according to a real-time wind speed change, whether the beam coverage radius needs to be recalculated, so that the ground device can dynamically adjust the beam width according to the beam coverage radius and a link between the ground device and the high-altitude device has more stable quality.

Figure 10:
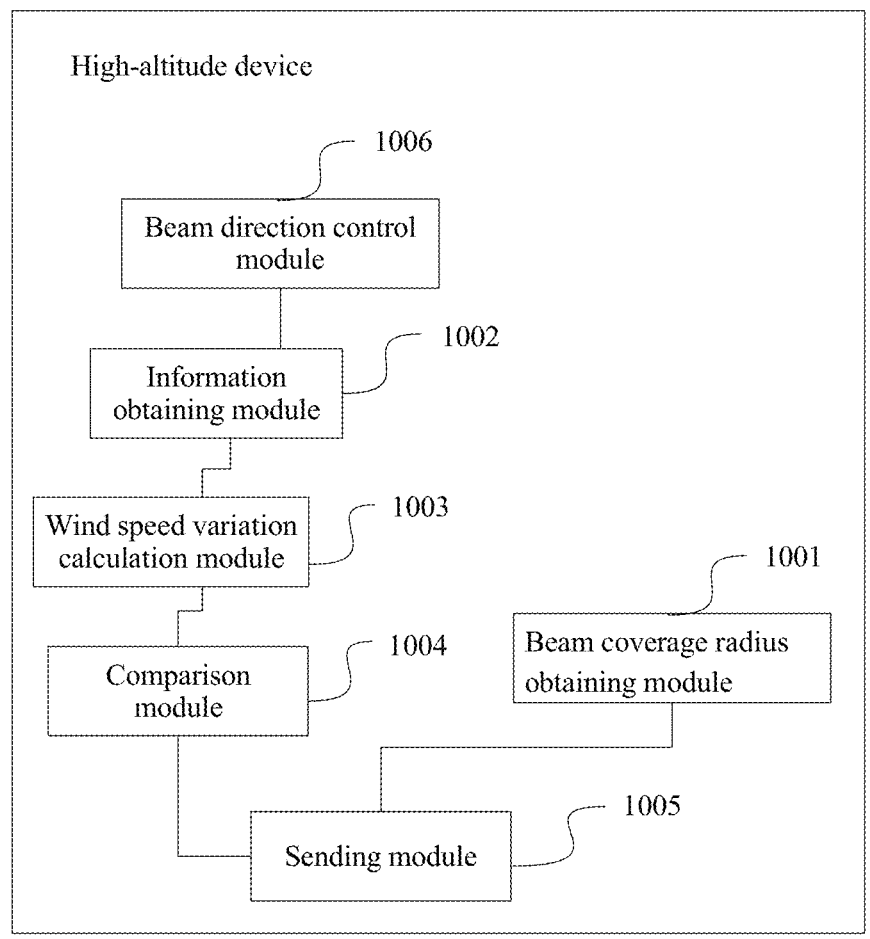
FIG. 10 is an block diagram of a high-altitude device according to an embodiment of the present invention.

FIG. 10 is an block diagram of a high-altitude device according to an embodiment of the present invention. Referring to FIG. 10, the high-altitude device is applied to a hierarchical network that includes a ground network and at least one aerial network, the high-altitude device is configured to control air-ground communication, and the high-altitude device includes:

a beam coverage radius obtaining module 1001, configured to calculate a beam coverage radius of a ground device for the high-altitude device according to a current moving speed relative to the ground or a flight track radius of the high-altitude device, where the flight track radius of the high-altitude device is calculated according to location information of the high-altitude device, the beam coverage radius is used to calculate a width of a beam from the ground device to the high-altitude device, the ground device is located in the ground network, the high-altitude device is located in the aerial network, and a beam of the high-altitude device covers the ground device;

an information obtaining module 1002, configured to obtain wind speed information, where the wind speed information indicates an instantaneous wind speed obtained by the high-altitude device, where optionally, for example, the information obtaining module may include a Global Positioning System (Global Positioning System, GPS), an inertial navigation system, an anemometer, and various motion sensors (such as an accelerometer, a magnetometer, and a gyroscope);

a wind speed variation calculation module 1003, configured to calculate a wind speed variation, where the wind speed variation is a vector including a wind speed change value and a direction, and the wind speed variation is used to indicate a variation between a current instantaneous wind speed obtained by the information obtaining module 1002 and a previously obtained average wind speed in a time period;

a comparison module 1004, configured to: compare, with a preset threshold, the wind speed change value calculated by the wind speed variation calculation module 1003, and determine, according to a comparison result, whether the beam coverage radius needs to be recalculated, where the comparison module 1004 is specifically configured to: compare, with the preset threshold, the wind speed change value calculated by the wind speed variation calculation module, and if the wind speed change value is greater than or equal to the preset threshold, recalculate the beam coverage radius; or if the wind speed change value is less than or equal to the preset threshold, skip recalculating the beam coverage radius; and further, if the comparison module 1004 determines to recalculate the beam coverage radius, the beam coverage radius obtaining module 1001 is further configured to:

calculate a new moving speed of the high-altitude device relative to the ground according to the wind speed variation and the current moving speed of the high-altitude device relative to the ground; and recalculate the beam coverage radius according to the new moving speed relative to the ground; and a sending module 1005, configured to send beam control information to the ground device, where the beam control information includes at least the beam coverage radius.

As shown in FIG. 10, optionally, the high-altitude device further includes:

a beam direction control module 1006, configured to determine a direction and width information of a beam from the high-altitude device to the ground device according to the location information of the high-altitude device obtained by the information obtaining module 1002 and location information of the ground device, where the location information of the ground device is preconfigured for the high-altitude device, where the sending module 1005 is specifically configured to:

send the location information of the high-altitude device to the ground device in the beam direction determined by the beam direction control module 1006.

Further, the information obtaining module 1002 is further configured to obtain the location information of the high-altitude device; and the sending module 1005 is further configured to send the location information of the high-altitude device obtained by the information obtaining module to the ground device.

Optionally, the ground device is a BBU, a base station, or a cloud baseband unit, the cloud baseband unit includes a plurality of BBUs, and the high-altitude device is an RRU, a repeater, or an antenna.

In the technical solution provided in this embodiment of the present invention, the high-altitude device may determine, according to a real-time wind speed change, whether the beam coverage radius needs to be recalculated, so that the ground device can dynamically adjust the beam width according to the beam coverage radius and a link between the ground device and the high-altitude device has more stable quality.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. An air-ground communication control method for a hierarchical network that comprises a ground network and at least one aerial network, the method comprising:

obtaining, by a ground device, a beam coverage radius for a high-altitude device, wherein the beam coverage radius is calculated according to a current moving speed of the high-altitude device relative to ground or a flight track radius of the high-altitude device, the flight track radius of the high-altitude device is calculated according to location information of the high-altitude device, the ground device is located in the ground network, the high-altitude device is located in the aerial network, and a beam of the high-altitude device covers the ground device;

determining, by the ground device, a direction of a beam from the ground device to the high-altitude device according to location information of the ground device;

determining, by the ground device, a width of the beam from the ground device to the high-altitude device according to the beam coverage radius; and controlling, by the ground device, the beam from the ground device to the high-altitude device according to the direction and the width of the beam from the ground device to the high-altitude device.

2. The air-ground communication control method according to claim 1, wherein the determining, by the ground device, a direction of a beam from the ground device to the high-altitude device according to location information of the ground device comprises:

calculating coordinates of a central location of a moving track of the high-altitude device according to the location information of the high-altitude device; and calculating the direction of the beam from the ground device to the high-attitude device according to the coordinates of the central location of the moving track of the high-altitude device and the location information of the ground device.

3. The air-ground communication control method according to claim 1, wherein the determining, by the ground device, a width of the beam from the ground device to the high-altitude device according to the beam coverage radius comprises:

calculating coordinates of a central location of the moving track of the high-altitude device according to the location information of the high-altitude device; and calculating the width of the beam from the ground device to the high-altitude device according to the coordinates of the central location of the moving track of the high-altitude device, the location information of the ground device, and the beam coverage radius.

4. The air-ground communication control method according to claim 2, wherein the calculating the direction of the beam from the ground device to the high-altitude device according to the coordinates of the central location of the moving track and the location information of the ground device comprises:

calculating a distance between the ground device and the central location of the moving track according to the coordinates of the central location of the moving track and the location information of the ground device; and calculating the direction of the beam from the ground device to the high-altitude device according to the distance between the ground device and the central location of the moving track, the coordinates of the central location of the moving track, and the location information of the ground device.

5. The air-ground communication control method according to claim 3, wherein the calculating the width of the beam from the ground device to the high-altitude device according to the coordinates of the central location of the moving track, the location information of the ground device, and the beam coverage radius comprises:

calculating a distance between the ground device and the central location of the moving track according to the coordinates of the central location of the moving track and the location information of the ground device; and calculating the width of the beam from the ground device to the high-altitude device according to the distance between the ground device and the central location of the moving track, the beam coverage radius, the coordinates of the central location of the moving track, and the location information of the ground device.

6. The air-ground communication control method according to claim 1, wherein the determining, by the ground device, a direction of a beam from the ground device to the high-altitude device according to location information of the ground device comprises:
   calculating a distance between the ground device and the high-altitude device according to the location information of the ground device and the location information of the high-altitude device; and
   calculating the direction of the beam from the ground device to the high-altitude device according to the distance between the ground device and the high-altitude device, the location information of the high-altitude device, and the location information of the ground device.

7. The air-ground communication control method according to claim 1, wherein the determining, by the ground device, a width of the beam from the ground device to the high-altitude device according to the beam coverage radius comprises:
   calculating a distance between the ground device and the high-altitude device according to the location information of the ground device and the location information of the high-altitude device; and
   calculating beam width information according to the distance between the ground device and the high-altitude device, the beam coverage radius, the location information of the high-altitude device, and the location information of the ground device.

8. The air-ground communication control method according to claim 1, wherein the ground device comprises one of a baseband unit (BBU), a base station, or a cloud baseband unit, and wherein the cloud baseband unit comprises a plurality of BBUs.

9. The air-ground communication control method according to claim 1, wherein the high-altitude device comprises one of a remote radio unit (RRU), a repeater, or an antenna.

10. An air-ground communication control method for a hierarchical network that comprises a ground network and at least one aerial network, the method comprising:
    calculating, by a high-altitude device, a beam coverage radius of a ground device for the high-altitude device according to a current moving speed of the high-altitude device relative to ground or a flight track radius of the high-altitude device, wherein the flight track radius of the high-altitude device is calculated according to location information of the high-altitude device, the beam coverage radius is used to calculate a width of a beam from the ground device to the high-altitude device, the ground device is located in the ground network, the high-altitude device is located in the aerial network, and a beam of the high-altitude device covers the ground device;
    obtaining, by the high-altitude device, wind speed information, wherein the wind speed information indicates an instantaneous wind speed obtained by the high-altitude device;
    calculating, by the high-altitude device, a wind speed variation, wherein the wind speed variation is a vector quantity comprising a wind speed change value and a direction, and the wind speed variation is used to indicate a variation between a current instantaneous wind speed and a an average wind speed determined over a time period;
    comparing, by the high-altitude device, the wind speed change value with a preset threshold;
    determining, by the high-altitude device according to the comparing, whether to recalculate the beam coverage radius; and
    sending, by the high-altitude device, beam control information to the ground device, wherein the beam control information comprises the beam coverage radius.

11. The air-ground communication control method according to claim 10, wherein the method further comprises:
    obtaining, by the high-altitude device, the location information of the high-altitude device; and
    sending, by the high-altitude device, the location information of the high-altitude device to the ground device.

12. The air-ground communication control method according to claim 10, wherein the determining, by the high-altitude device according to the comparing, whether to recalculate the beam coverage radius comprises:
    recalculating the beam coverage radius in response to the wind speed change value being greater than the preset threshold; and
    skipping recalculating the beam coverage radius in response to the wind speed change value being less than or equal to the preset threshold.

13. The air-ground communication control method according to claim 12, wherein the recalculating the beam coverage radius comprises:
    calculating a new moving speed of the high-altitude device relative to the ground according to the wind speed variation and the current moving speed of the high-altitude device relative to the ground; and
    recalculating the beam coverage radius according to the new moving speed relative to the ground.

14. The air-ground communication control method according to claim 10, wherein the method further comprises:
    calculating coordinates of a central location of a moving track of the high-altitude device according to the location information of the high-altitude device; and
    calculating a direction and a width of a beam from the high-altitude device to the ground device according to the coordinates of the central location of the moving track and location information of the ground device.

15. The air-ground communication control method according to claim 14, wherein the calculating a direction and a width of the beam from the high-altitude device to the ground device according to the coordinates of the central location of the moving track and location information of the ground device comprises:
    calculating a distance between the ground device and the central location of the moving track according to the coordinates of the central location of the moving track and the location information of the ground device;
    calculating the direction of the beam from the high-altitude device to the ground device according to the distance between the ground device and the central location of the moving track, the coordinates of the central location of the moving track, and the location information of the ground device;
    calculating a radius of the moving track according to the location information of the high-altitude device; and
    calculating beam width information according to the distance between the ground device and the central location of the moving track, a first preset value, the coordinates of the central location of the moving track, and the location information of the ground device, wherein the first preset value is greater than or equal to the radius of the moving track.

16. The air-ground communication control method according to claim 10, wherein the method further comprises:
   calculating a radius of a moving track of the high-altitude device according to the location information of the high-altitude device;
   calculating a distance between the ground device and the high-altitude device according to location information of the ground device and the location information of the high-altitude device;
   calculating a beam direction of a beam from the high-altitude device to the ground device according to the distance between the ground device and the high-altitude device, the location information of the high-altitude device, and the location information of the ground device; and
   calculating beam width information of the beam from the high-altitude device to the ground device according to the distance between the ground device and the high-altitude device, a second preset value, the location information of the high-altitude device, and the location information of the ground device, wherein the second preset value is greater than zero and less than or equal to the radius of the moving track.

17. The air-ground communication control method according to claim 10, wherein the ground device comprises one of a baseband unit (BBU) or a cloud baseband unit, wherein the cloud baseband unit comprises a plurality of BBUs, and wherein the high-altitude device comprises one of a remote radio unit (RRU), a repeater, or a reflector antenna.

18. A ground device of a hierarchical network that comprises a ground network and at least one aerial network, the ground device comprising:
   an obtaining module configured to obtain a beam coverage radius for a high-altitude device, wherein the beam coverage radius is calculated according to a current moving speed of the high-altitude device relative to ground or a flight track radius of the high-altitude device, the flight track radius of the high-altitude device is calculated according to location information of the high-altitude device, the ground device is located in the ground network, the high-altitude device is located in the aerial network, and a beam of the high-altitude device covers the ground device;
   a beam direction module configured to determine a direction of a beam from the ground device to the high-altitude device according to location information of the ground device;
   a beam width module configured to determine a width of the beam from the ground device to the high-altitude device according to the beam coverage radius; and
   a control module configured to control the beam from the ground device to the high-altitude device according to the direction and the width of the beam from the ground device to the high-altitude device.

19. The ground device according to claim 18, wherein the beam direction module comprises:
   a track center coordinates calculation unit, configured to calculate coordinates of a central location of a moving track of the high-altitude device according to the location information of the high-altitude device; and
   a direction calculation unit, configured to calculate the direction of the beam from the ground device to the high-altitude device according to the coordinates of the central location of the moving track of the high-altitude device and the location information of the ground device.

20. The ground device according to claim 18, wherein the beam width module comprises:
   a track center coordinates calculation unit configured to calculate coordinates of a central location of a moving track of the high-altitude device according to the location information of the high-altitude device; and
   a beam width calculation unit configured to calculate the width of the beam from the ground device to the high-altitude device according to the coordinates of the central location of the moving track of the high-altitude device, the location information of the ground device, and the beam coverage radius.

21. The ground device according to claim 18, wherein the beam direction module comprises:
   a distance calculation module configured to calculate a distance between the ground device and the high-altitude device according to the location information of the ground device and the location information of the high-altitude device; and
   a beam direction calculation module configured to calculate the direction of the beam from the ground device to the high-altitude device according to the distance between the ground device and the high-altitude device, the location information of the high-altitude device, and the location information of the ground device.

22. The ground device according to claim 18, wherein the beam width module comprises:
   a radius calculation module configured to calculate a radius of a moving track of the high-altitude device according to the location information of the high-altitude device;
   a distance calculation module configured to calculate a distance between the ground device and the high-altitude device according to the location information of the ground device and the location information of the high-altitude device; and
   a beam width information calculation module configured to calculate beam width information of the beam from the ground device to the high-altitude device according to the distance between the ground device and the high-altitude device, the beam coverage radius, the location information of the high-altitude device, and the location information of the ground device.

23. The ground device according to claim 18, wherein the ground device comprises one of a baseband unit (BBU), a base station, or a cloud baseband unit, wherein the cloud baseband unit comprises a plurality of BBUs, and wherein the high-altitude device comprises one of a remote radio unit (RRU), a repeater, or an antenna.

24. A high-altitude device of a hierarchical network that comprises a ground network and at least one aerial network, the high-altitude device comprising:
   a beam coverage radius obtaining module configured to calculate a beam coverage radius of a ground device for the high-altitude device according to a current moving speed of the high-altitude device relative to ground or a flight track radius of the high-altitude device, wherein the flight track radius of the high-altitude device is calculated according to location information of the high-altitude device, the beam coverage radius is used to calculate a width of a beam from the ground device to the high-altitude device, the ground device is located in the ground network, the high-altitude device is located in the aerial network, and a beam of the high-altitude device covers the ground device;

an information obtaining module configured to obtain wind speed information, wherein the wind speed information indicates an instantaneous wind speed obtained by the high-altitude device;

a wind speed variation calculation module configured to calculate a wind speed variation, wherein the wind speed variation is a vector quantity comprising a wind speed change value and a direction, and the wind speed variation is used to indicate a variation between a current instantaneous wind speed obtained by the information obtaining module and an average wind speed determined over a time period;

a comparison module, configured to compare, with a preset threshold, the wind speed change value calculated by the wind speed variation calculation module, and to determine, according to a comparison result, whether to recalculate the beam coverage radius; and a sending module configured to send beam control information to the ground device, wherein the beam control information comprises the beam coverage radius.

25. The high-altitude device according to claim 24, wherein the information obtaining module is further configured to obtain the location information of the high-altitude device, wherein the high-altitude device further comprises:
a beam direction control module; configured to determine a direction and width information of a beam from the high-altitude device to the ground device according to the location information of the high-altitude device and location information of the ground device, wherein the location information of the ground device is preconfigured for the high-altitude device, wherein
the sending module is further configured to:
send the location information of the high-altitude device to the ground device in the direction of the beam from the high-altitude device to the ground device determined by the beam direction control module.

26. The high-altitude device according to claim 24, wherein
the information obtaining module is further configured to obtain the location information of the high-altitude device, and
the sending module is further configured to send the location information of the high-altitude device obtained by the information obtaining module to the ground device.

27. The high-altitude device according to claim 24, wherein the comparison module is further configured to:
recalculate the beam coverage radius in response to the wind speed change value being greater than the preset threshold, and
skip recalculating the beam coverage radius in response to the wind speed change value being less than or equal to the preset threshold.

28. The high-altitude device according to claim 27, wherein when the comparison module is configured to recalculate the beam coverage radius, the beam coverage radius obtaining module is further configured to:
calculate a new moving speed of the high-altitude device relative to the ground according to the wind speed variation and the current moving speed of the high-altitude device relative to the ground, and recalculate the beam coverage radius according to the new moving speed relative to the ground.

29. The high-altitude device according to claim 24, wherein the ground device comprises one of a baseband unit (BBU), a base station, or a cloud baseband unit, wherein the cloud baseband unit comprises a plurality of BBUs, and wherein the high-altitude device comprises one of a remote radio unit (RRU), a repeater, or an antenna.

* * * * *

UNITED STATES PATENT AND TRADEMARK OFFICE
CERTIFICATE OF CORRECTION

PATENT NO. : 10,637,558 B2  
APPLICATION NO. : 16/457578  
DATED : April 28, 2020  
INVENTOR(S) : Kaiyao Wang and Yongjun Liu It is certified that error appears in the above-identified patent and that said Letters Patent is hereby corrected as shown below:

In the Claims

Claim 2, Column 38, Line 21, replace "high-attitude" with --high-altitude--.

Signed and Sealed this
Nineteenth Day of January, 2021

Andrei Iancu
*Director of the United States Patent and Trademark Office*